United States Patent [19]
Hachiya et al.

[11] Patent Number: 6,005,350
[45] Date of Patent: Dec. 21, 1999

[54] ELECTROLUMINESCENT DRIVING APPARATUS WITH PHOTODETECTOR

[75] Inventors: Yoshiaki Hachiya, Shiga; Yuji Yamanishi, Osaka; Yuji Ueno, Shiga, all of Japan

[73] Assignee: Matsushita Electric Industrial Co., Ltd., Osaka, Japan

[21] Appl. No.: 09/027,623

[22] Filed: Feb. 23, 1998

[30] Foreign Application Priority Data

Feb. 24, 1997 [JP] Japan .................................. 9-038856
Dec. 2, 1997 [JP] Japan .................................. 9-331714

[51] Int. Cl.$^6$ .................................................. H05B 37/02
[52] U.S. Cl. .......................... 315/156; 315/155; 315/158; 315/169.3; 250/205
[58] Field of Search ................................ 315/169.3, 158, 315/156, 155; 250/205

[56] References Cited

U.S. PATENT DOCUMENTS

| | | | |
|---|---|---|---|
| 3,107,314 | 10/1963 | Asars ....................................... | 315/158 |
| 4,467,246 | 8/1984 | Tanaka et al. ........................... | 315/158 |
| 5,336,978 | 8/1994 | Alessio ................................... | 315/169.3 |
| 5,349,269 | 9/1994 | Kimball .................................. | 315/169.3 |

*Primary Examiner*—Michael B Shingleton
*Attorney, Agent, or Firm*—McDermott, Will & Emery

[57] ABSTRACT

An EL driving apparatus is composed of a display portion, a photodiode as changing means for changing a reference voltage for controlling an increased voltage based on ambient brightness and a control portion for controlling the timing of discharging based on the reference voltage. The control portion has a comparator for comparing a specified peak value obtained by reducing the increased voltage generated by voltage increasing means with the reference voltage generated from within. The increased voltage is inputted to the control portion. The increased voltage is reduced to provide a detect voltage that can be inputted to the comparator. The comparator has a positive-phase input terminal for receiving the detect voltage and a negative-phase input terminal for receiving the reference voltage produced at a connection point between a constant current source and a resistor connected in series to each other. The photodiode is connected between the ground and the connection point between the constant current source and the resistor to form a reverse bias.

10 Claims, 22 Drawing Sheets

ELECTROLUMINESCENT DRIVING APPARATUS WITH PHOTODETECTOR

BACKGROUND OF THE INVENTION

The present invention relates to electroluminescent driving apparatus and, more particularly, to an electroluminescent driving apparatus capable of controlling the luminance of light emitted from an electroluminescent element based on ambient brightness.

An electroluminescent (hereinafter referred to as EL) element is among conventional elements used in displays of electric-field light-emission type. For example, Japanese Laid-Open Patent Publication HEI 8-45661 has disclosed an EL driving apparatus for driving the EL element.

Referring to the drawings, the conventional EL driving apparatus disclosed therein will be described.

FIG. 16 shows a circuit configuration of the conventional EL driving apparatus. As shown in FIG. 16, the EL driving apparatus consists of a display portion 200, a photodetector portion 250, and a control unit 260.

The display portion 200 has: a series circuit composed of a coil 201 and a diode 202 connected in series at a common connection point; a first switch element 203 having a gate connected to the control unit 260, a drain connected to the common connection point, and a source connected to the ground; a power source 204 connected to the terminal of the series circuit closer to the coil 201; a second switch element 205 having a gate connected to the control unit 260, a drain connected to the terminal of the series circuit closer to the diode 202, and a source connected to the ground; and an EL element 206 connected in parallel with the series circuit between the power source 204 and the second switch element 205.

The photodetector portion 250 has: a photodiode 251 as a photodetector element for sensing ambient brightness; an operational amplifier 252 for receiving an output signal from the photodiode 252, amplifying the output signal, and outputting the amplified signal; an A/D converter 253 for receiving the amplified signal, converting the amplified signal to a digital signal, and outputting the digital signal; first and second resistors 254 and 255 connected in series at a common connection point to generate a specified voltage by resistive division; and a third switch 256 having a gate connected to the control unit 260, a drain connected to the terminal of the second resistor 255 on the opposite side of the common connection point, and a source connected to the ground. The terminal of the first resistor 254 on the opposite side of the connection point is connected to the power source 204 of the display portion 200.

The operational amplifier 252 has a positive-phase input terminal connected to the common connection point for the first and second resistors 254 and 255 and to the negative electrode of the photodiode 251 and a negative-phase input terminal connected to the positive electrode of the photodiode 251. The output signal from the operational amplifier 252 is feedbacked thereto via a third resistor 257.

The arrows accompanying the signs of the N-type MOS transistors indicative of the respective switch elements 203, 205, and 256 represent the sources thereof, which similarly applies to the other drawings.

A description will be given to the outline of the operation of the EL driving apparatus thus constituted.

On receiving a pulse signal C1 from the control unit 260, the display portion 200 repeats a sequence of operations of shifting the first switch element 203 from the OFF state to the ON state and returning the first switch element 203 to the OFF state and thereby accumulates charges in the electrode of the EL element 206 closer to the diode 202 by using a counter electromotive force generated at the coil 201, resulting in an increased voltage at the electrode. When the second switch element 205 is in the ON state because of a pulse signal C2 having a period longer than the period of the pulse signal C1 from the control unit 260, the display portion 200 releases the charges accumulated in the electrode of the EL element 206 closer to the diode 202 and thereby causes the EL element 206 to emit light.

The photodiode 251 of the photodetector portion 250 senses ambient brightness and a signal representing the sensed brightness is amplified by the operational amplifier 252 and converted to a digital signal by the A/D converter 253.

The control unit 260 receives the digital signal after conversion and changes the period during which the first switch element 203 is in the ON state based on the digital signal. Specifically, the ON-state period is elongated when the ambient brightness is high to increase the value of the increased voltage applied to the EL element 206 or the ON-state period is shortened when the ambient brightness is low to reduce the value of the increased voltage applied to the EL element 206, whereby the luminance of the EL element 206 is controlled.

If the display portion 200 is provided with a plurality of EL elements 206, however, capacitances vary with the EL elements 206 since the conventional EL driving apparatus controls the luminance of the EL element by changing the frequency of the voltage applied to the EL element 206 based on ambient brightness. This varies voltages applied to the individual EL elements 206 and causes undesired variations in the luminance of the whole display portion 200.

In the case where any of the EL elements 206 is replaced with another or where any of the EL elements 206 is electrically disconnected for some reason or other, the capacitance of the EL element 206 is lost, though it is overwhelmingly larger than the capacitance of each of the transistors composing each of the switch elements. Since capacitance is inversely proportional to voltage, the capacitance of the display portion 200 that has been minimized increases the drain voltage of the transistor to a value exceeding the withstand voltage of the transistor, thus incurring the destruction of the transistor.

In the case where the waveform of the voltage applied to the EL element 206 during discharging has a steep falling-edge portion from the increased voltage to 0 V, if the frequency of the pulse signal C2 for controlling the cycle of charging and discharging is on the order of 400 Hz in the audible range, the steep falling-edge portion gives vibrations to the EL element 206 and causes noise. The suppression of the vibrating sound of the EL element is particularly desired in a mobile communication device such as a portable telephone and other electronic devices, which are seriously affected by noise occurring in service. Therefore, the improvement of the waveform of the voltage applied to the EL element 206 is essential to these devices.

SUMMARY OF THE INVENTION

It is therefore a first object of the present invention to control the luminance of an EL element and reduce variations in the luminance of the EL element. A second object of the present invention is to prevent the destruction of such an element as an internal transistor when the EL element is disconnected. A third object of the present invention is to reduce noise resulting from vibrations produced by the EL element.

The EL driving apparatus according to the present invention for achieving the foregoing first object is an EL driving apparatus for causing an EL element to emit light by repeatedly applying an increased voltage to the EL element and releasing charges accumulated in the EL element by the increased voltage applied thereto, the apparatus comprising: voltage increasing means for generating the increased voltage to be applied to the EL element; discharging means for releasing the charges accumulated in the EL element by the voltage increasing means; control means for activating the discharging means when the increased voltage reaches a specified peak voltage; and changing means having a photodetector element for sensing ambient brightness, the changing means changing the peak voltage for the control means based on an output from the photodetector element.

With the EL driving apparatus comprising the control means for activating the discharging means when the increased voltage reaches the specified peak voltage and the changing means for changing the peak voltage for the control means based on the output from the photodetector element, even when a plurality of EL elements are used, discharging is initiated only when the increased voltage applied to each of the EL elements reaches the specified peak voltage, so that no variation is observed in the luminances of the EL elements. Moreover, since the peak value for the control means is changed based on the output from the photodetector element which senses ambient brightness and converts the sensed brightness to an electric signal, the luminance of the EL element is controlled based on the ambient brightness.

In the EL driving apparatus, the changing means preferably decreases the value of the peak voltage as ambient brightness increases. In the arrangement, if the EL element is to be used in a full-face light-emitting plate, i.e., if an identification code such as a letter or sign in a dark tone is to be recognized by using the EL element as back light, the luminance of the EL element is lowered when ambient brightness is high, resulting in lower power consumption. On the other hand, specified luminance is attained when ambient brightness is low, so that the degree of visual recognition of the identification code is not lowered.

In the EL driving apparatus of the present invention, the changing means preferably increases the value of the peak voltage as ambient brightness decreases. In the arrangement, if an identification code such as a letter or sign is to be recognized by using the EL element to cause the identification code itself to glow, the luminance of the EL element is increased when ambient brightness is high, so that the degree of visual recognition of the identification code is increased. On the other hand, specified power consumption can be maintained when ambient brightness is low.

In the EL driving apparatus of the present invention, the control means preferably has a comparator having one input terminal receiving the peak voltage applied thereto and the other input terminal receiving a reference voltage applied thereto, the comparator comparing the peak voltage with the reference voltage and output a result of comparison to the discharging means, the reference voltage being changed by the output signal from the photodetector element. The arrangement ensures lower power consumption by adapting the photodetector element to reduce the set value of the reference voltage for the comparator when ambient brightness is high. On the other hand, luminance can surely be increased by adapting the photodetector element to increase the set value of the reference voltage for the comparator when ambient brightness is high.

In the EL driving apparatus of the present invention, the discharging means is preferably composed of a switch element for releasing the charges from the EL element when the switch element is in the ON state. This ensures easy provision of the discharging means.

In the EL driving apparatus of the present invention, the peak voltage is preferably lower than a withstand voltage of the switch element. This attains the second object and prevents the switch element composed of, e.g., a transistor from being destroyed even when the EL element is disconnected for some reason or other, since charging occurs at the time at which the peak voltage is reached.

In the EL driving apparatus according to the present invention, the voltage increasing means preferably has a first polarity inverting switch element for accumulating charges in one electrode of the EL element and a second polarity inverting switch element for accumulating charges in the other electrode of the EL element, the discharging means preferably has a first discharging switch element for grounding the one electrode of the EL element and a second discharging switch element for grounding the other electrode of the EL element, and the control means preferably places one pair formed by the first polarity inverting switch element and the second discharging switch element in the ON state, while placing the other pair formed by the second polarity inverting switch element and the first discharging switch element in the OFF state, or preferably places the one pair formed by the first polarity inverting switch element and the second discharging switch element in the OFF state, while placing the other pair formed by the second polarity inverting switch element and the first discharging switch element in the ON state. In the arrangement, if one pair formed by the first polarity inverting switch and the second discharging switch element is in the ON state, charging of one electrode of the EL element is performed via the first polarity inverting switch element, while discharging of the other electrode of the EL element is concurrently performed via the second discharging switch element, resulting in efficient charging and discharging.

The EL driving apparatus according to the present invention preferably further comprises discharge delay means provided between the discharging means and the EL element, the discharge delay means delaying a period during which charges are released from the EL element. The arrangement attains the third object and causes a delay to flatten the waveform of the output from the EL element during discharging, so that the steep falling-edge portion of the waveform of the applied voltage becomes flatter. Consequently, the vibration of the EL element resulting from the ac component of the applied voltage is reduced and noise caused by the vibration is suppressed.

The EL driving apparatus of the present invention preferably further comprises a resistor connected in series at least between the first discharging switch element and the one electrode of the EL element or between the second discharging switch element and the other electrode of the EL element, the resistor delaying a period during which charges are released from the EL element. The arrangement attains the third object and ensures easy flattening of the waveform of the output from the EL element during discharging. This is achieved by a signal delay caused by the resistor further provided to delay the period during which charges accumulated in the EL element are released.

In the EL driving apparatus, the peak voltage is preferably lower than a withstand voltage of any of the first polarity inverting switch element, the second polarity inverting switch element, the first discharging switch element, and the second discharging switch element. The arrangement attains the second object and prevents the switch element composed of, e.g., a transistor from being destroyed even when the EL element is disconnected for some reason or other, since charging occurs at the time at which the peak voltage is reached.

BRIEF DESCRIPTION OF THE DRAWINGS

FIGS. 10 are timing charts for individual signals in the EL driving apparatus according to the fifth embodiment, of which FIG. 10(a) is a waveform chart of a voltage at a common connection point connected to a first output terminal of a switching circuit, FIG. 10(b) is a waveform chart of a voltage at the first output terminal, FIG. 10(c) is a waveform chart of a voltage at a second output terminal, and FIG. 10(d) is a waveform chart of a voltage applied to an EL element;

FIGS. 12 are timing charts for individual signals in the EL driving apparatus according to the first variation of the fifth embodiment, of which FIG. 12(a) is a waveform chart of a voltage at a connection point connected to a second output terminal of a switching circuit, FIG. 12(b) is a waveform chart of a voltage at the second output terminal, FIG. 12(c) is a waveform chart of a voltage at a first output terminal, and FIG. 12(d) is a waveform chart of a voltage applied to an EL element;

FIGS. 14 are timing charts for individual signals in the EL driving apparatus according to the second variation of the fifth embodiment, of which FIG. 14(a) is a waveform chart of a voltage at a connection point connected to a first output terminal of a switching circuit, FIG. 14(b) is a waveform chart of a voltage at the first output terminal, FIG. 14(c) is a waveform chart of a voltage at a second output terminal, FIG. 14(d) is a waveform chart of a voltage at a connection point connected to the second output terminal, and FIG. 14(e) is a waveform chart of a voltage applied to an EL element;

FIGS. 18 are timing charts for individual signals in the conventional EL driving apparatus, of which FIG. 18(a) is a waveform chart of a voltage at a connection point connected to a first output terminal of a switching circuit, FIG. 18(b) is a waveform chart of a voltage at the first output terminal, FIG. 18(c) is a wave form chart of a voltage at a second output terminal, and FIG. 18(d) is a waveform chart of a voltage applied to an EL element;

FIGS. 20 are timing charts for individual signals in the conventional EL driving apparatus, of which FIG. 20(a) is a waveform chart of the voltage at the connection point connected to the second output terminal of the switching circuit, FIG. 20(b) is a waveform chart of the voltage at the second output terminal, FIG. 20(c) is a waveform chart of the voltage at the first output terminal, and FIG. 20(d) is a waveform chart of the voltage applied to the EL element;

FIGS. 22 are timing charts for individual signals in the conventional EL driving apparatus, of which FIG. 22(a) is a waveform chart of the voltage at the connection point connected to the first output terminal of the switching circuit, FIG. 22(b) is a waveform chart of the voltage at the first output terminal, FIG. 22(c) is a waveform chart of the voltage at the second output terminal, FIG. 22(d) is a waveform chart of the voltage at the second output terminal of the switching circuit, and FIG. 22(e) is a waveform chart of the voltage applied to the EL device.

DETAILED DESCRIPTION OF THE INVENTION (First Embodiment)

A first embodiment of the present invention will be described with reference to the drawings.

Figure 1:
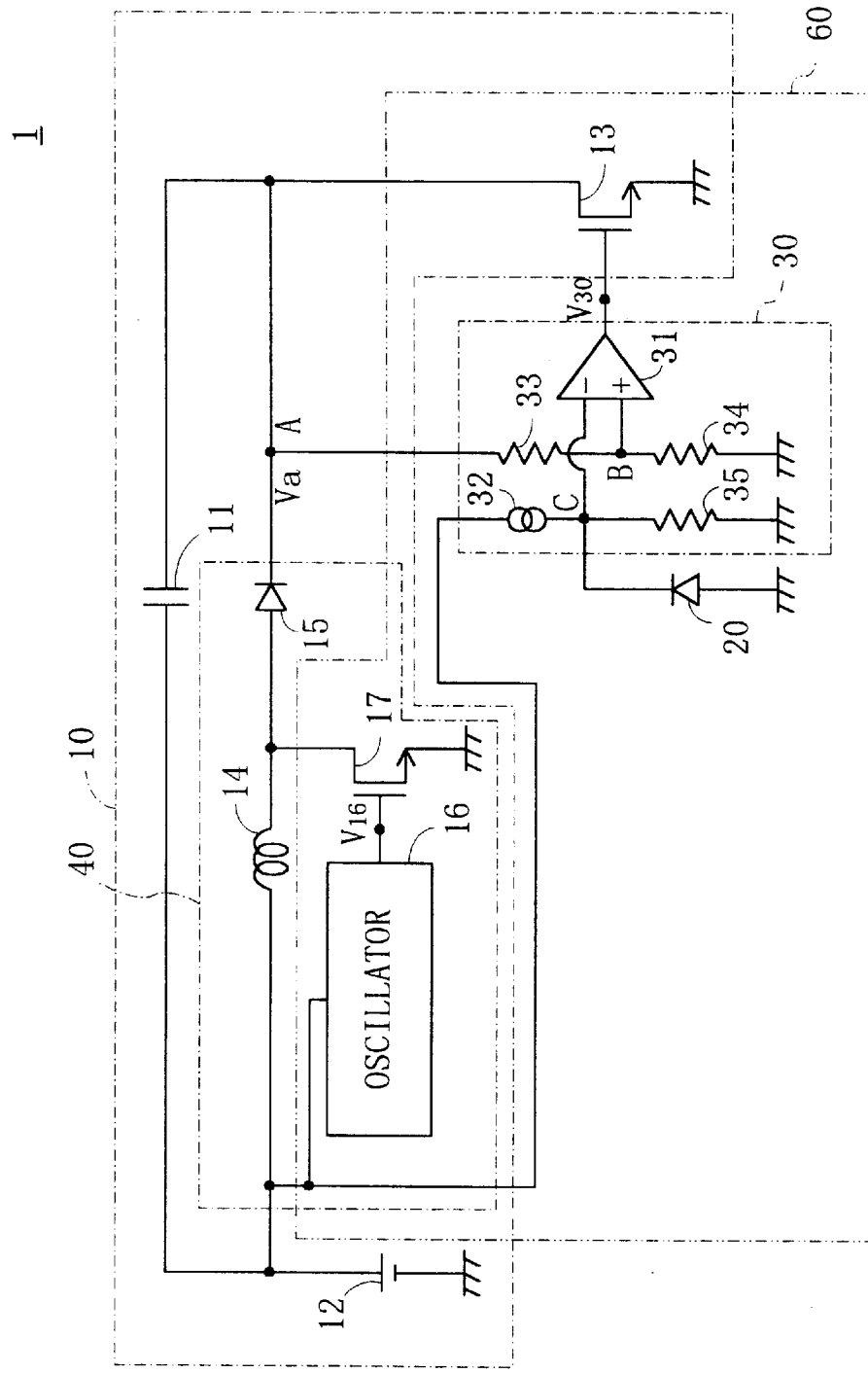
FIG. 1 is a circuit diagram of an EL driving apparatus according to a first embodiment of the present invention.

FIG. 1 shows a circuit configuration of an EL driving apparatus according to the first embodiment. The EL driving apparatus 1 comprises: a display portion 10; a photodiode 20 as changing means for changing a reference voltage used to control an increased voltage based on ambient brightness; and a control portion 30 as control means for controlling the timing of discharging based on the reference voltage.

The display portion 10 has: an EL element 11; a dc voltage source 12; voltage increasing means 40 for generating an increased voltage to be applied to the EL element 11; and a discharging transistor 13 as discharging means for releasing charges accumulated in the EL element 11, which is composed of an N-type MOS transistor having a gate connected to the output terminal of the control portion 30 and a drain connected to the electrode of the EL element 11 on the opposite side of the dc voltage source 12 and to the output terminal of the voltage increasing means 40.

The voltage increasing means 40 consists of: a coil 14 for generating a counter electromotive force for increasing a voltage whereby charges are accumulated in the EL element 11; a diode 15 for preventing the generated increased voltage from being applied to the coil 14; an oscillator 16 for generating a pulse signal with a specified period for generating the counter electromotive force; and a voltage increasing transistor 17 composed of an N-type MOS transistor having a gate connected to the output terminal of the oscillator 16, a drain connected to the series connection point between the coil 14 and the diode 15, and a source connected to the ground to apply a specified voltage to the both end portions of the coil 14 when the pulse signal from the oscillator 16 is on the HIGH level.

The control portion 30 has a comparator 31 for comparing a specified peak value obtained by reducing the increased voltage generated by the voltage increasing means 40 with the reference voltage generated from within, a constant current source 32 for generating the reference voltage, and three resistors 33, 34, and 35.

Specifically, the control portion 30 receives an increased voltage Va at a connection point A which is the terminal of the diode 15 on the opposite side of the coil 14. The comparator 31 has a positive-phase input terminal for receiving a detect voltage Vb at a connection point B as a common connection point for the first and second resistors 33 and 34 and a negative-phase input terminal for receiving a reference voltage Vc generated at a connection point C as a common connection point for the constant current source 32 and the third resistor 35 connected in series to each other. The detect voltage Vb is obtained by reducing the increased voltage Va to a value that can be inputted to the comparator 31.

The comparator 31 produces an output signal V30 on the LOW level when the detect voltage Vb is lower than the reference voltage Vc and produces the output signal V30 on the HIGH level when the detect voltage Vb coincides with the reference voltage Vc. By turning ON the discharging transistor 13 when the increased voltage reaches a specified value and the detect voltage Vb coincides with the reference voltage Vc, charges accumulated in the electrode of the EL element 11 closer to the connection point A are released.

The photodiode 20 is connected between the connection point C and the ground to form a reverse bias. Since the current flowing from the connection point C to the ground through the photodiode 20 is increased in amount as the ambient brightness increases, the current flowing from the connection point C through the resistor 35 is reduced in amount, resulting in the lowering of the voltage at the connection point C, i.e., the reference voltage Vc.

The reference voltage Vc has been determined such that the increased voltage Va is equal to or lower than the drain withstand voltage of the discharging transistor 13.

The region 60 shown in FIG. 1 represents a span that can be contained in a single package during the manufacturing of the EL driving apparatus 1, which can be embodied in the following three forms.

1. When the EL driving apparatus 1 is composed of three components (chips), which are:
   (a) an IPD (Intelligent Power Device) chip consisting of the discharging transistor 13, the oscillator 16, the voltage increasing transistor 17; and the control portion 30;
   (b) a photosensor consisting of the photodiode 20; and
   (c) a bipolar IC for amplifying a signal outputted from the photosensor 2. When the EL driving apparatus 1 is composed of two components (chips), which are:
   (a) an IPD chip; and
   (b) a photo IC consisting of a photosensor and a bipolar IC 3. When the EL driving apparatus 1 is composed of one component (chip), which is
   (a) a chip into which an IPD and a photo IC are integrated A description will be given to the operation of the EL driving apparatus 1 thus constituted.

Figure 2:
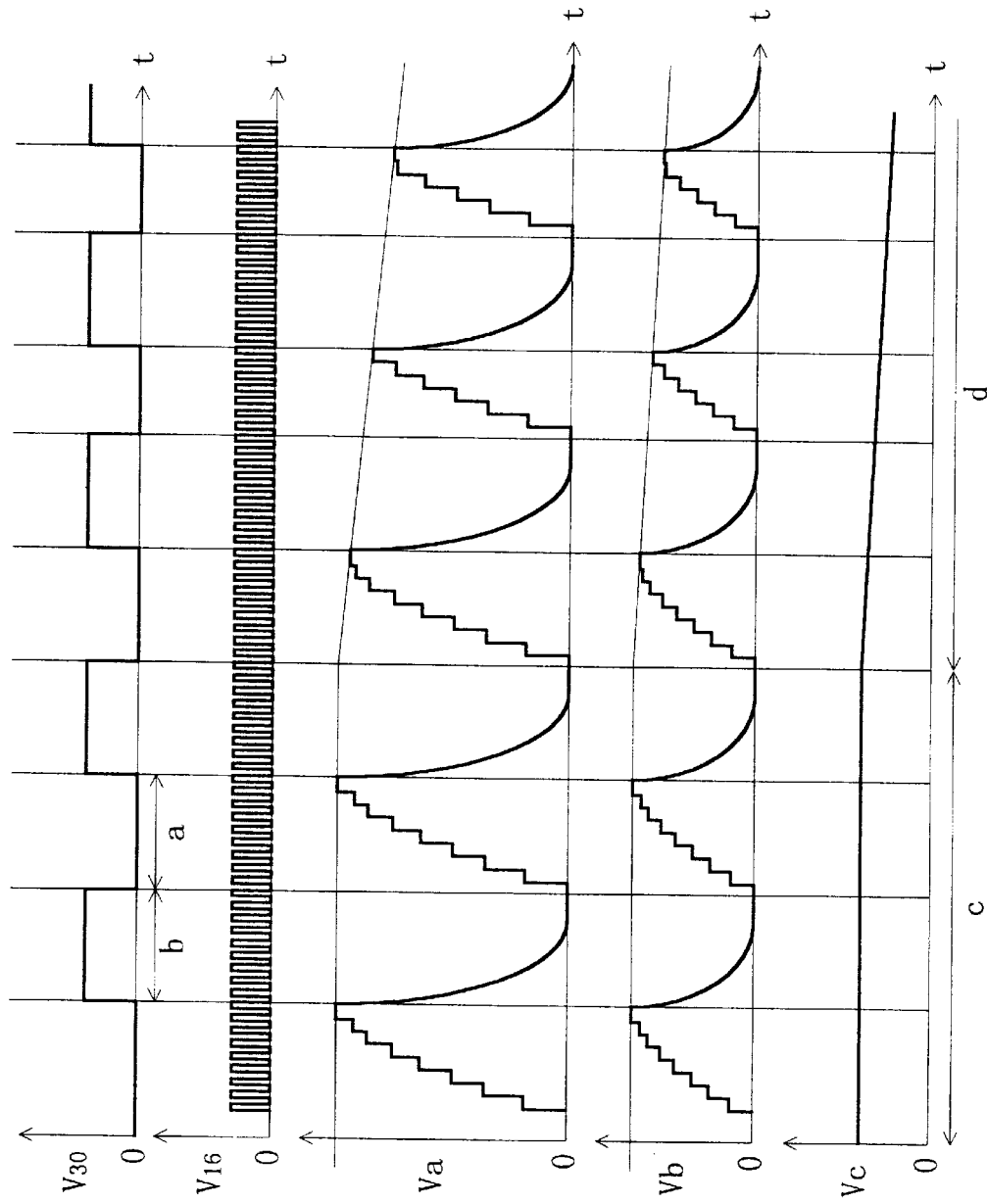
FIG. 2 is a timing chart for individual signals in the EL driving apparatus according to the first embodiment.

FIG. 2 is a timing chart for individual signals in the EL driving apparatus according to the first embodiment, in which are shown: the waveform V30 of an output voltage from the comparator 31; the waveform V16 of a pulse output voltage from the oscillator 16; the waveform Va of the increased voltage applied to the EL element 11; the waveform Vb of the detect voltage from the comparator 31; and the waveform Vc of the reference voltage from the comparator 31.

First, as shown in FIG. 2, the increased voltage Va at the connection point A is increased by the pulse voltage V16 outputted from the oscillator 16 during the period (period a in FIG. 2) during which the output voltage V30 from the comparator is in the OFF state.

Next, the output voltage V30 from the comparator 31 shifts to the ON state when the increased voltage Va reaches the peak value, i.e., when the detect voltage Vb reflecting the change in the increased voltage Va reaches the reference voltage Vc (period b in FIG. 2), whereby charges accumulated in the EL element 11 are released and each of the values of the increased voltage Va and the detect voltage Vb becomes 0 V.

During the period c of the reference voltage Vc, the EL element 11 is assumed to emit light of such intensity as to keep the surroundings thereof in dark conditions, i.e., prevent a photoelectric current from flowing through the photodiode 20. During the period d of the reference voltage Vc, the EL element 11 is assumed to emit light of such intensity as to keep the surroundings thereof in bright conditions, i.e., allow a photoelectric current to flow through the photodiode 20. Since the reference voltage Vc lowers during the period d during which the EL element 11 emits light of such intensity as to allow the photoelectric current to flow, as described above, the peak value of the detect voltage Vb, i.e., the peak value of the increased voltage Va lowers as the reference voltage Vc lowers, resulting in a reduction in the luminance of the EL element 11.

Thus, in the EL driving apparatus according to the present embodiment, the luminance of the EL element 11 is reduced when the ambient brightness exceeds a specified illuminance determined by the properties of the photodiode 20. Hence, if the EL element 11 is used as back light which causes the surroundings of an identification code, such as a letter or sign, to glow for the recognition of the identification code, not in a full-face light-emitting plate which causes the identification code itself to glow, power consumption can be lowered when ambient brightness is high, because of the reduced luminance of the EL element. On the other hand, the degree of visual recognition of the identification code is not lowered even when ambient brightness is low, because of a specified luminance that can be attained.

In the case where a plurality of EL elements 11 are provided in the EL driving apparatus and caused to emit light simultaneously, discharging is initiated only when the increased voltage Va applied to each of the EL elements 11 reaches a specified peak voltage, so that no variation is observed in the luminances of the EL elements 11.

Even when the EL element 11 is disconnected for some reason or other and placed in an electrically open state, the discharging transistor 13 will not be destroyed due to the peak value of the increased voltage Va that has been adjusted to be equal to or lower than the drain withstand voltage of the discharging transistor 13. This improves the reliability of the EL driving apparatus.

(Second Embodiment)

A second embodiment of the present invention will be described with reference to the drawings.

Figure 3:
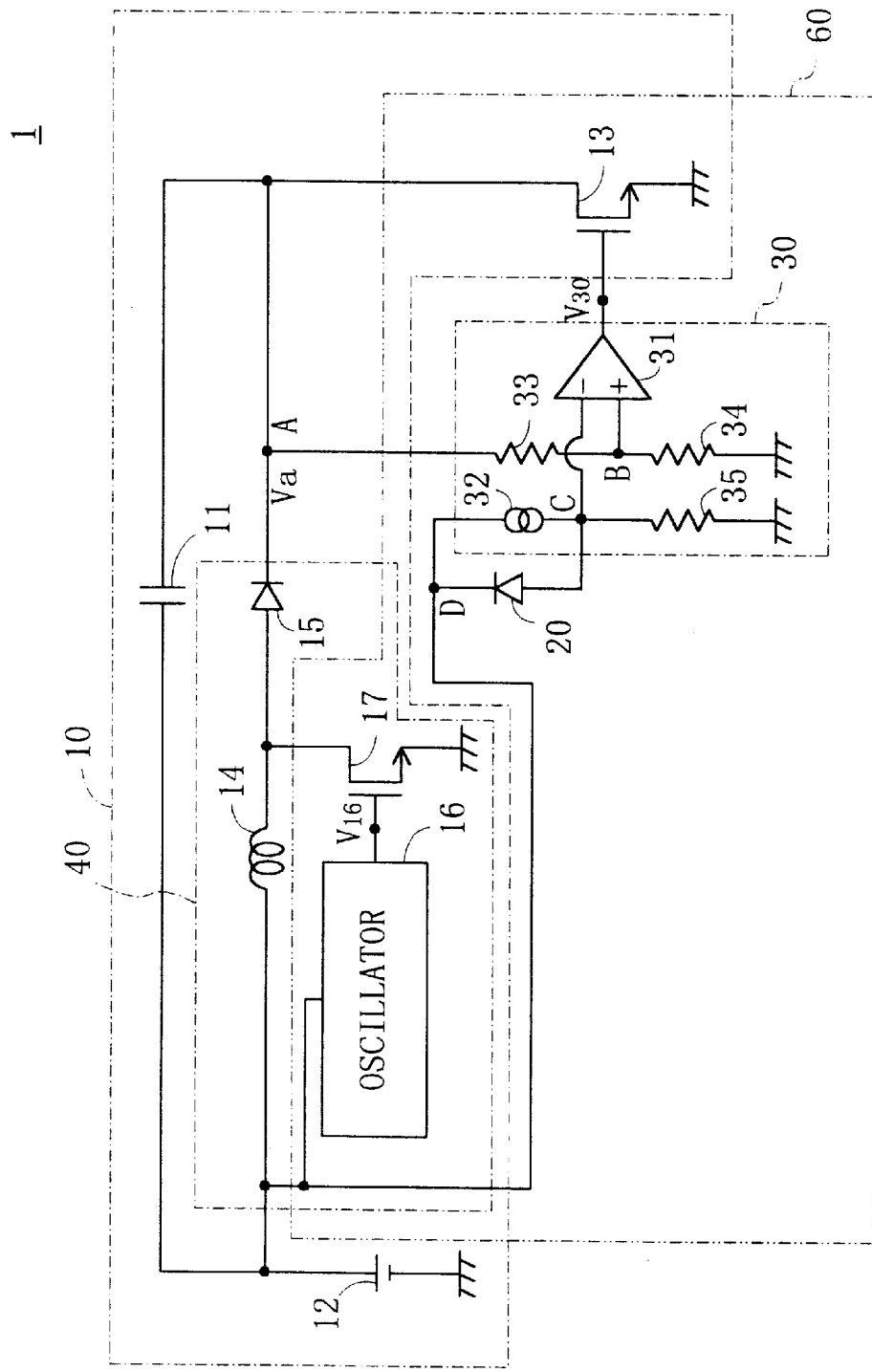
FIG. 3 is a circuit diagram of an EL driving apparatus according to a second embodiment of the present invention.

FIG. 3 shows a circuit configuration of an EL driving apparatus according to the second embodiment. In FIG. 3, the description of the same components as shown in FIG. 1 will be omitted by providing the same reference numerals.

The second embodiment is different from the first embodiment in that the photodiode 21 as the photodetector element of the changing means is connected in parallel with the constant current source 32 between the connection point D, which is the terminal of the constant current source 32 closer to the dc voltage source 12, and the connection point C in the control portion 30, thereby forming a reverse bias. With the photodiode 21 thus connected, the current flowing from the connection point D to the connection point C through the photodiode 21 increases in amount as ambient brightness increases, so that the current flowing from the connection point C through the resistor 35 increases, resulting in an increase in the voltage at the connection point C, i.e., the reference voltage Vc.

A description will be given to the operation of the EL driving apparatus 1 thus constituted.

Figure 4:
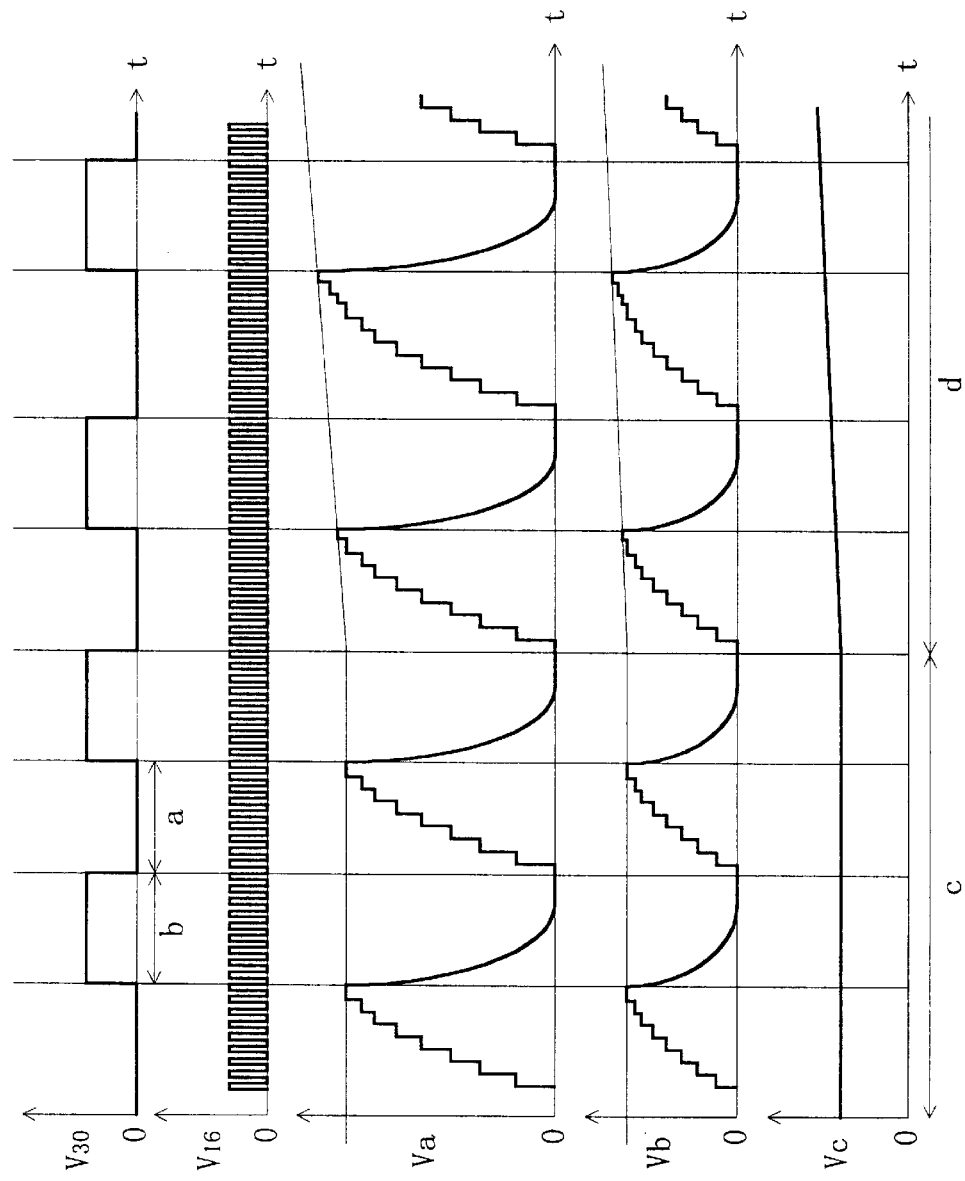
FIG. 4 is a timing chart for individual signals in the EL driving apparatus according to the second embodiment.

FIG. 4 is a timing chart for individual signals in the EL driving apparatus according to the second embodiment. In FIG. 4, the EL element 11 is assumed to emit light of such intensity as to keep the surroundings thereof in dark conditions, i.e., prevent a photoelectric current from flowing through the photodiode 21 during the period c of the reference voltage Vc and the EL element 11 is assumed to emit light of such intensity as to keep the surroundings thereof in bright conditions, i.e., allow a photoelectric current to flow through the photodiode 21 during the period d of the reference voltage Vc. Since the reference voltage Vc increases during the period d during which the EL element 11 emits light of such intensity as to allow a photoelectric current to flow, the peak value of the increased voltage Va is increased, resulting in an increase in the luminance of the EL element 11.

Thus, in the EL driving apparatus according to the present embodiment, the luminance of the EL element 11 is increased when ambient brightness exceeds a specified luminance determined by the properties of the photodiode 21. Hence, if the EL element 11 is used to cause an identification code such as a letter or sign to glow, the luminance of the EL element 11 is increased when ambient brightness is high so that the degree of visual recognition of the identification code is increased. On the other hand, specified power consumption is maintained when ambient brightness is low.

In the present embodiment also, the EL element 11 may be used as back light for isolating the identification code not emitting light from its glowing surroundings, similarly to the first embodiment. In some applications, the use of the EL element 11 as back light is preferred since the luminance of the back light is increased when ambient brightness is high.

In the case where a plurality of EL elements 11 are provided in the EL driving apparatus 1 and caused to emit light simultaneously, discharging is initiated only when the increased voltage Va applied to each of the EL elements 11 reaches the peak voltage, so that no variation is observed in the luminances of the EL elements 11.

Even when the EL element 11 is disconnected for some reason or other and placed in an electrically open state, the discharging transistor 13 will not be destroyed due to the peak value of the increased voltage Va that has been adjusted to be equal to or lower than the drain withstand voltage of the discharging transistor 13. This improves the reliability of the EL driving apparatus.

(Third Embodiment)

A third embodiment of the present invention will be described with reference to the drawings.

Figure 5:
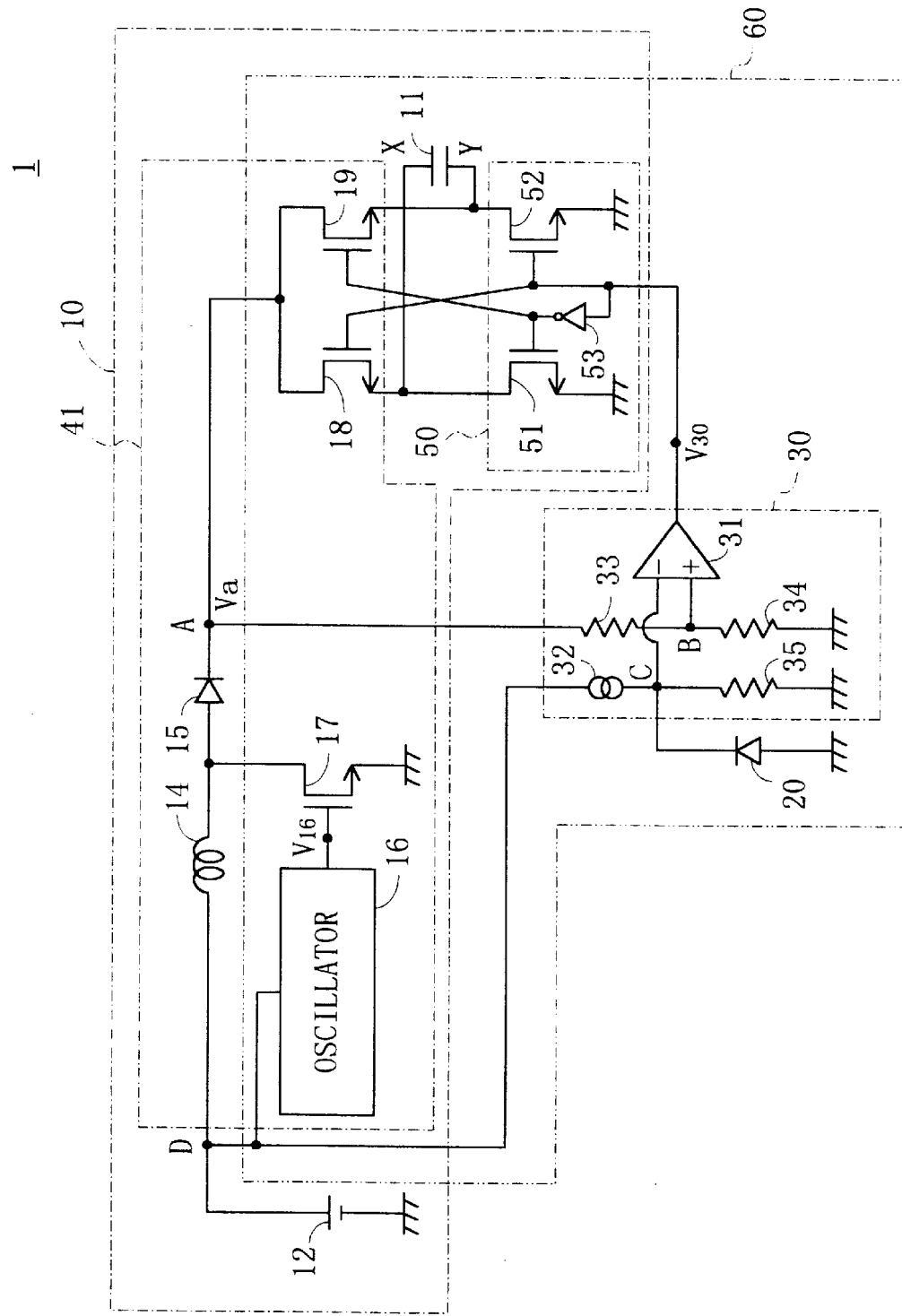
FIG. 5 is a circuit diagram of an EL driving apparatus according to a third embodiment of the present invention.

FIG. 5 shows a circuit configuration of an EL driving apparatus according to the third embodiment. In FIG. 5, the description of the same components as shown in FIG. 1 will be omitted by providing the same reference numerals. In contrast to the first and second embodiments in which one of the two electrodes of the EL element 11, i.e., the electrode closer to the diode 15 is charged and discharged, the present embodiment switches the polarities of the both electrodes upon each charging and discharging.

Specifically, as shown in FIG. 5, voltage increasing means 41 has first and second polarity inverting transistors 18 and 19 which are interposed between the EL element 11 and the diode 15. The first polarity inverting transistor 18 is composed of an N-type MOS transistor having a drain connected to the negative electrode of the diode 15, a gate receiving an output signal from the control portion 30, and a source connected to the first output terminal X of the EL element 11. The second polarity inverting transistor 19 is composed of an N-type MOS transistor having a drain connected in common with the drain of the first polarity inverting transistor 18 to the negative electrode of the diode 15, a gate receiving an inverted output signal from the control portion 30, and a source connected to the second output terminal Y of the EL element 11.

Discharging means 50 has: a first discharging transistor 51 composed of an N-type MOS transistor having a drain connected to the source of the first polarity inverting transistor 18 and to the first output terminal X, a gate receiving the inverted output signal from the control portion 30, and a source connected to the ground; a second discharging transistor 52 composed of an N-type MOS transistor having a drain connected to the source of the second polarity inverting transistor 19 and to the second output terminal Y, a gate receiving an output signal from the control portion 30, and a source connected to the ground; and an inverter 53 connected between the output terminal of the control portion 30 and the common gate of the second polarity inverting transistor 19 and of the first discharging transistor 51 to invert the output signal from the control portion 30 and output the inverted signal.

The reference voltage Vc from the comparator 31 of the control portion 30 has been determined such that the increased voltage Va is lower than the drain withstand voltage of each of the first and second polarity converting transistors 18 and 19 and the first and second discharging transistors 51 and 52.

A description will be given to the operation of the EL driving apparatus 1 thus constituted.

Figure 6:
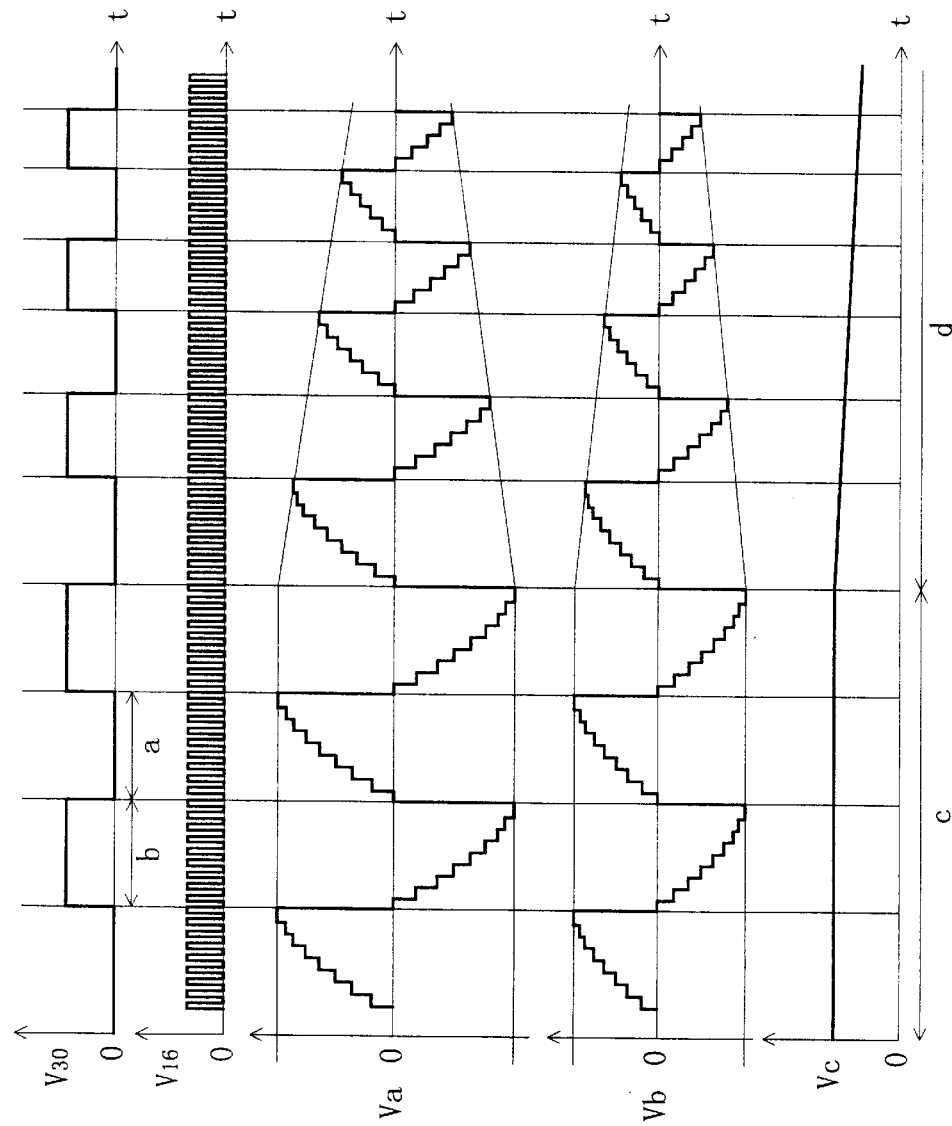
FIG. 6 is a timing chart for individual signals in the EL driving apparatus according to the third embodiment.

FIG. 6 is a timing chart for individual signals in the EL driving apparatus 1 according to the third embodiment. As shown in FIG. 6, during the period a during which the output voltage V30 from the control portion 30 is on the LOW level, the second polarity inverting transistor 19 and the first discharging transistor 51 are in the ON state, while the first polarity inverting transistor 18 and the second discharging transistor 52 are in the OFF state. Consequently, charges accumulated in the first output terminal X of the EL element are released via the first discharging transistor 51 connected to the first output terminal X, while charges are accumulated in the second output terminal Y via the second polarity inverting transistor 19 connected to the second output terminal Y. As a result, the absolute value of the increased voltage Va shown in FIG. 6 increases in a positive direction determined on the basis of the first output terminal X.

Next, when the increased voltage Va has reached the peak value, i.e., when the detect voltage Vb corresponding to the value of the increased voltage Va has reached the reference voltage Vc, the output voltage V30 from the comparator 31 shifts to the ON state (period b in FIG. 6) so that charges accumulated in the second output terminal Y of the EL element are released via the second discharging transistor 52 connected to the second output terminal Y, while charges are accumulated in the first output terminal X via the first polarity inverting transistor 18 connected to the first output terminal X. As a result, the absolute value of the increased voltage Va shown in FIG. 6 increases in a negative direction determined on the basis of the first output terminal X.

In contrast to the first and second embodiments in which charging and discharging is performed only once in one cycle of the OFF and ON periods a and b of the output voltage V30 from the comparator 31 of the control portion 30 and therefore the EL element 11 emits light only once in one cycle, the present embodiment alternately charges and discharges the first and second output terminals X and Y of the EL element 11 so that the EL element 11 emits light twice in one cycle, resulting in improved light-emitting efficiency.

Moreover, since the photodiode 20 as the photodetector element of the changing means is connected between the connection point C and the ground to form a reverse bias, similarly to the first embodiment, the reference voltage Vc lowers during the period d during which the EL element 11 emits light of such intensity as to allow a photoelectric current to flow. As the reference voltage Vc lowers, the peak value of the detect voltage Vb, i.e., the peak value of the increased voltage Va lowers, resulting in a reduction in the luminance of the EL element 11. If the EL element 11 is used as back light for an identification code, therefore, the luminance of the EL element is reduced accordingly when ambient brightness is high, resulting in lower power consumption.

In the case where a plurality of EL elements 11 are provided in the EL driving apparatus 1 and caused to emit light simultaneously, discharging is initiated only when the increased voltage Va applied to each of the EL elements 11 reaches the peak voltage, so that no variation is observed in the luminances of the EL elements 11.

Even when the EL element 11 is disconnected for some reason or other and placed in an electrically open state, none of the first and second polarity inverting transistors 18 and 19 and of the first and second discharging transistors 51 and 52 will be destroyed due to the peak value of the increased voltage Va that has been adjusted to be equal to or lower than the drain withstand voltage of any of these transistors. This improves the reliability of the EL driving apparatus.

(Fourth Embodiment)

Referring to the drawings, a fourth embodiment of the present invention will be described.

Figure 7:
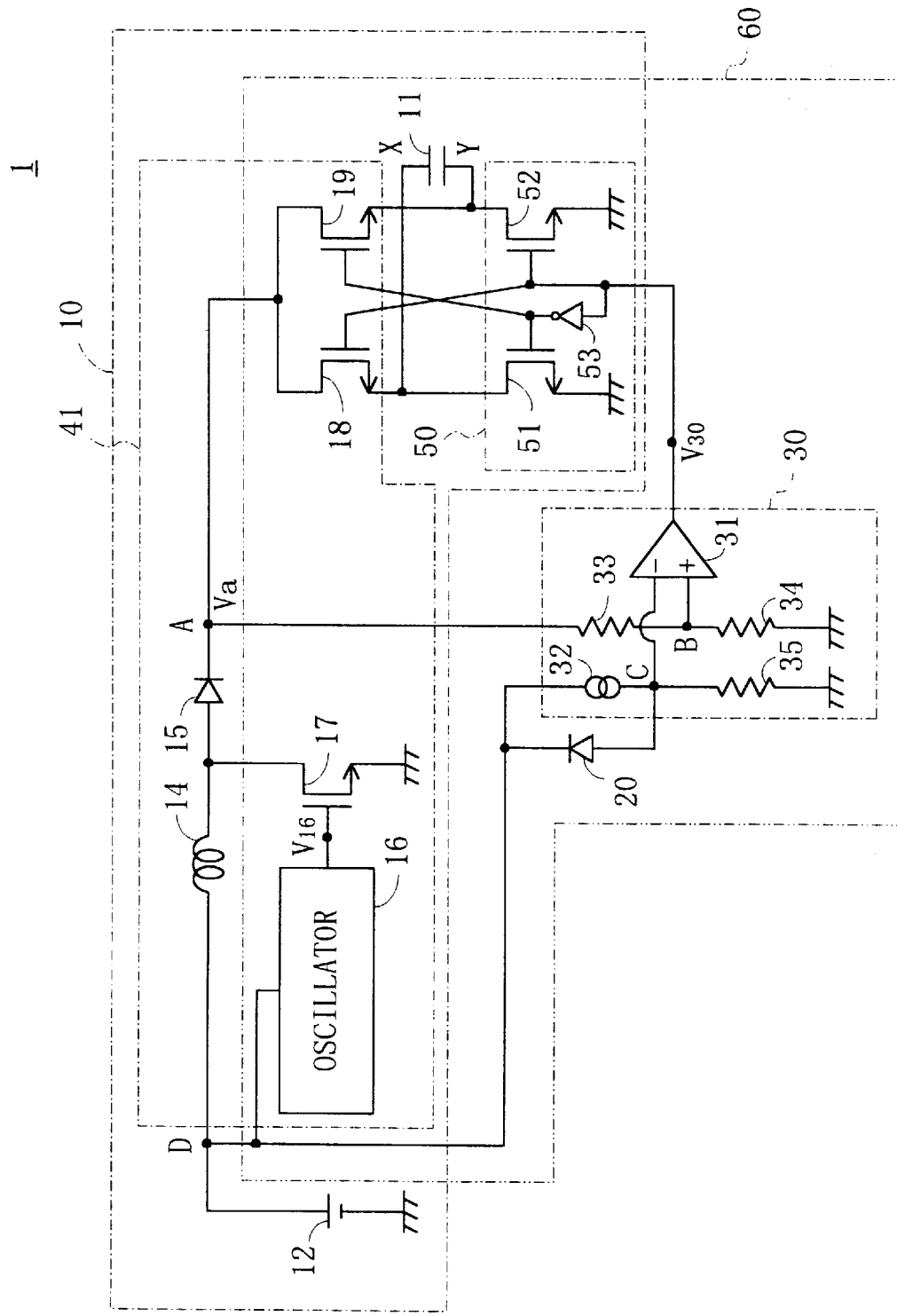
FIG. 7 is a circuit diagram of an EL driving apparatus according to a fourth embodiment of the present invention.

FIG. 7 shows a circuit configuration of an EL driving apparatus according to the fourth embodiment. In FIG. 7, the description of the same components as shown in FIG. 5 will be omitted by providing the same reference numerals. The fourth embodiment is different from the third embodiment in that the photodiode 21 as the photodetector element of the changing means is connected in parallel with the constant current source 32 between the connection point D, which is the terminal of the constant current source 32 closer to the dc voltage source 12, and the connection point C of the control portion 32, thereby forming a reverse bias.

Figure 8:
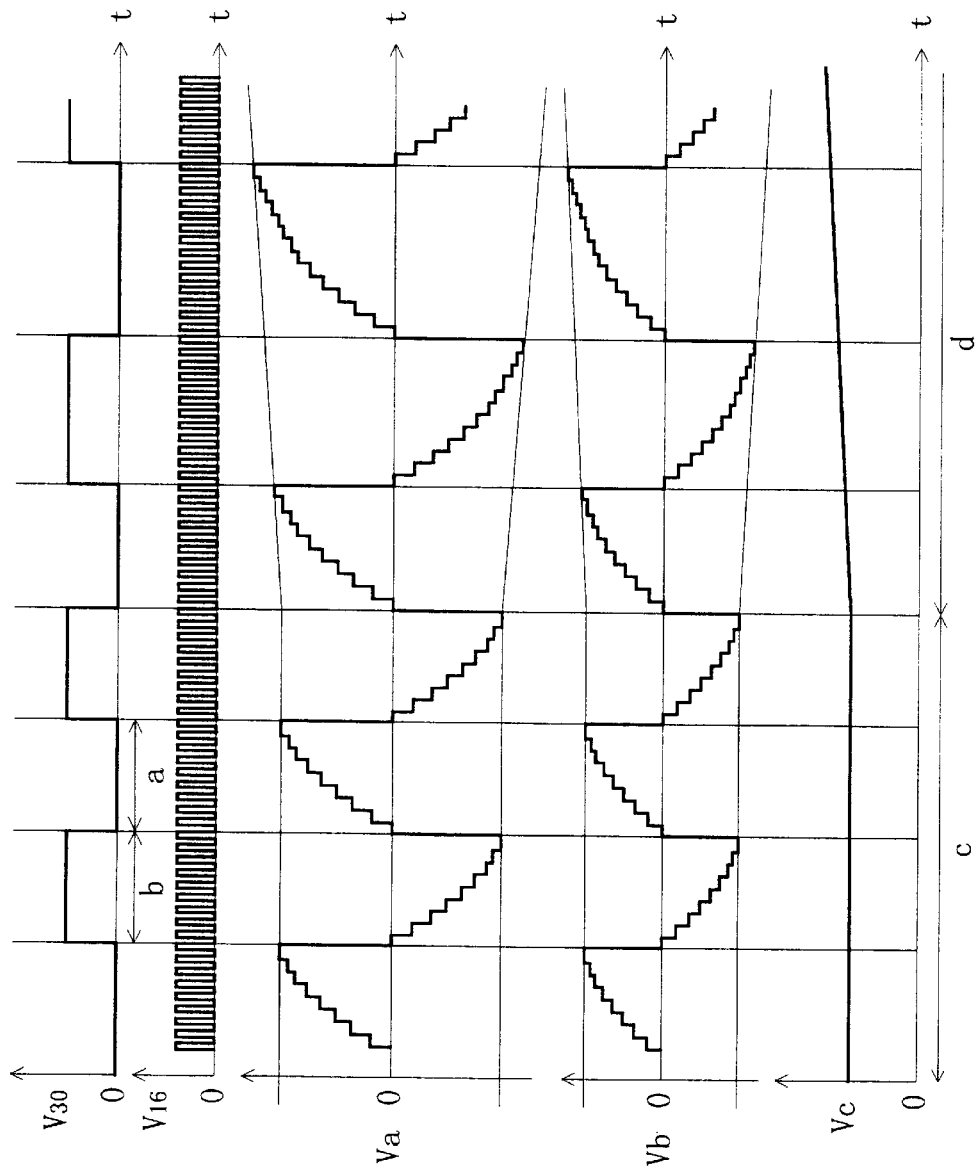
FIG. 8 is a timing chart for individual signals in the EL driving apparatus according to the fourth embodiment.

Consequently, charging and discharging is performed twice in one cycle of the OFF-state and ON-state periods a and b of the output voltage V30 from the comparator 31 of the control portion 30 in the EL driving apparatus 1 according to the present embodiment, as shown in the timing chart for individual signals of FIG. 8. This improves the light-emitting efficiency of the EL element 11.

Moreover, since the photodiode 21 as the photodetector element of the changing means is connected in parallel with the constant current source 32 between the connection point D closer to the dc voltage source 12 and the connection point C of the control portion 32 to form a reverse bias, similarly to the second embodiment, the reference voltage Vc increases during the period d during which the EL element 11 emits light of such intensity as to allow a photoelectric current to flow. As the reference voltage Vc increases, the peak value of the detect voltage Vb, i.e., the peak value of the increased voltage Va increases, resulting in an increase in the luminance of the EL element 11. If the EL element 11 is used to cause an identification code to glow, the luminance of the EL element increases when ambient brightness is high, so that the degree of visual recognition of the identification code is increased.

In the case where a plurality of EL elements 11 are provided in the EL driving apparatus 11 and caused to emit light simultaneously, discharging is initiated only when the increased voltage Va applied to each of the EL elements 11 reaches the peak voltage, so that no variation is observed in the luminances of the EL elements 11.

Even when the EL element 11 is disconnected for some reason or other and placed in an electrically open state, none of the first and second polarity inverting transistors 18 and 19 and of the first and second discharging transistors 51 and 52 will be destroyed due to the peak value of the increased voltage Va that has been adjusted to be equal to or lower than the drain withstand voltage of any of these transistors.

(Fifth Embodiment)

Referring to the drawings, a fifth embodiment of the present invention will be described.

Figure 9:
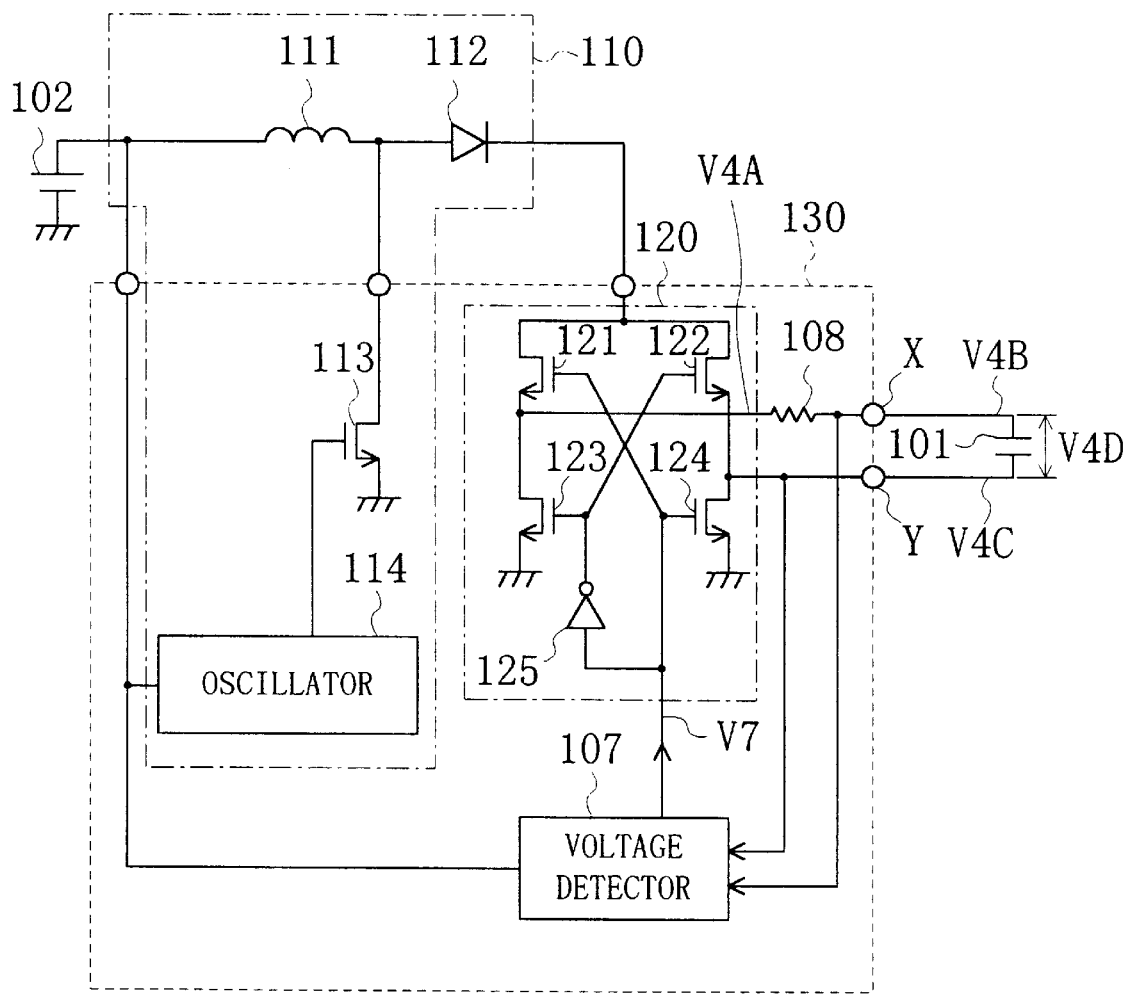
FIG. 9 is a circuit diagram of an EL driving apparatus according to a fifth embodiment of the present invention.

FIG. 9 shows a circuit configuration of an EL driving apparatus according to the fifth embodiment, in which are shown: an EL element 101 for causing a display panel to emit light; a dc voltage source 102; a voltage increasing circuit 110 for increasing a voltage from the dc voltage source 102 and applying the increased voltage to the EL element 101; a switching circuit 120 for charging or discharging the EL element 101 by inverting the polarity of the increased voltage, the switching circuit including discharging means; a voltage detector 107 as control means for detecting the peak value of the increased voltage applied to the EL element 101 and outputting, to the switching circuit 120, a detect signal for switching the polarity of the EL element 101; a resistor 108 as discharge delay means for delaying and flattening a falling-edge portion of the waveform during the releasing of charges accumulated in the EL element 101; and a region 130 to be integrated into the top surface of a semiconductor substrate.

The voltage detector 107 has one input terminal connected to the dc voltage source 102, the other input terminal connected to the first and second output terminals X and Y for connection with the EL element 101, and an output terminal connected to the switching circuit 120. Although the voltage detector 107 may be composed specifically of a circuit using a zener diode or a circuit or comparator utilizing resistive division, the use of a circuit using a high-accuracy and low-cost zener diode is preferred. In that case, variations in the increased voltage applied to the EL element 101 can be reduced to a degree that only variations in the intrinsic properties of the zener diode are observed.

The voltage increasing circuit 110 is composed of: a coil 111 having one end connected to the dc voltage source 102; a diode 112 having a positive electrode connected to the other end of the coil 111 and a negative electrode connected to the switching circuit 120 to prevent a voltage in the reverse direction from being applied to the coil 111; a voltage increasing transistor 113 composed of an N-type MOS transistor having a drain connected to a common connection point for the coil 111 and the diode 112 and a source connected to the ground; and an oscillator 114 having an output terminal connected to the gate of the voltage increasing transistor 113 and an input terminal connected to the dc voltage source 102 to determine the switching frequency for the voltage increasing transistor 113. Although the MOS transistor has been used to compose the voltage increasing transistor 113, it is not limited thereto. A bipolar transistor may be used instead to compose the voltage increasing transistor 113.

The switching circuit 120 has first and second polarity inverting transistors 121 and 112 as a polarity inverter for the EL element 101, first and second discharging transistors 123 and 124 as a discharger for the EL element 101, and an inverter 125 for inverting an output signal from the voltage detector 107 and outputting the inverted output signal.

The first polarity inverting transistor 121 is composed of an N-type MOS transistor having a drain connected to the voltage increasing circuit 110, a gate receiving the detect signal from the voltage detector 107, and a source connected to the first output terminal X of the EL element 101 via the resistor 108. The second polarity inverting transistor 122 is composed of an N-type MOS transistor having a drain connected in common with the drain of the first polarity inverting transistor 121 to the voltage increasing circuit 110, a gate receiving the inverted output signal from the control portion 30, and a source connected to the second output terminal Y of the EL element 101.

The first discharging transistor 123 is composed of an N-type MOS transistor having a drain connected to the source of the first polarity inverting transistor 121 and to the first output terminal X, a gate receiving the inverted output signal from the control portion 30, and a source connected to the ground. The second discharging transistor 124 is composed of an N-type MOS transistor having a drain connected to the source of the second polarity inverting transistor 122 and to the second output terminal Y, a gate receiving the output signal from the control portion 30, and a source connected to the ground.

It is assumed that the EL driving apparatus includes at least the switching circuit 120 and the voltage detector 107.

In FIG. 9, a voltage at a common connection point for the source of the first polarity inverting transistor 121 and the drain of the first discharging transistor 123 is designated at V4A, a voltage at the first output terminal X is designated at V4B, a voltage at a common connection point for the source of the second polarity inverting transistor 122 and the drain of the second discharging transistor 124, i.e., a voltage at the second output terminal Y is designated at V4C, a potential difference between the first and second output terminals X and Y, which is the voltage applied to the EL element 101, i.e., a difference between the voltages V4B and V4C is designated at V4D.

A description will be given to the operation of the EL driving apparatus thus constituted.

As shown in FIG. 9, the voltage detector 107 monitors the value of the voltage V4D applied to the EL element 101. If the voltage detector 107 detects a specified peak voltage and outputs a detect signal V7 on the HIGH level to the switching circuit 120, the first polarity inverting transistor 121 and the second discharging transistor 124 are turned ON, while the second polarity inverting transistor 122 and the first discharging transistor 123 are turned OFF, so that the voltage V4A at the source of the first polarity inverting transistor 121 is increased and the voltage V4C at the second output terminal Y becomes 0 V.

Figure 10:
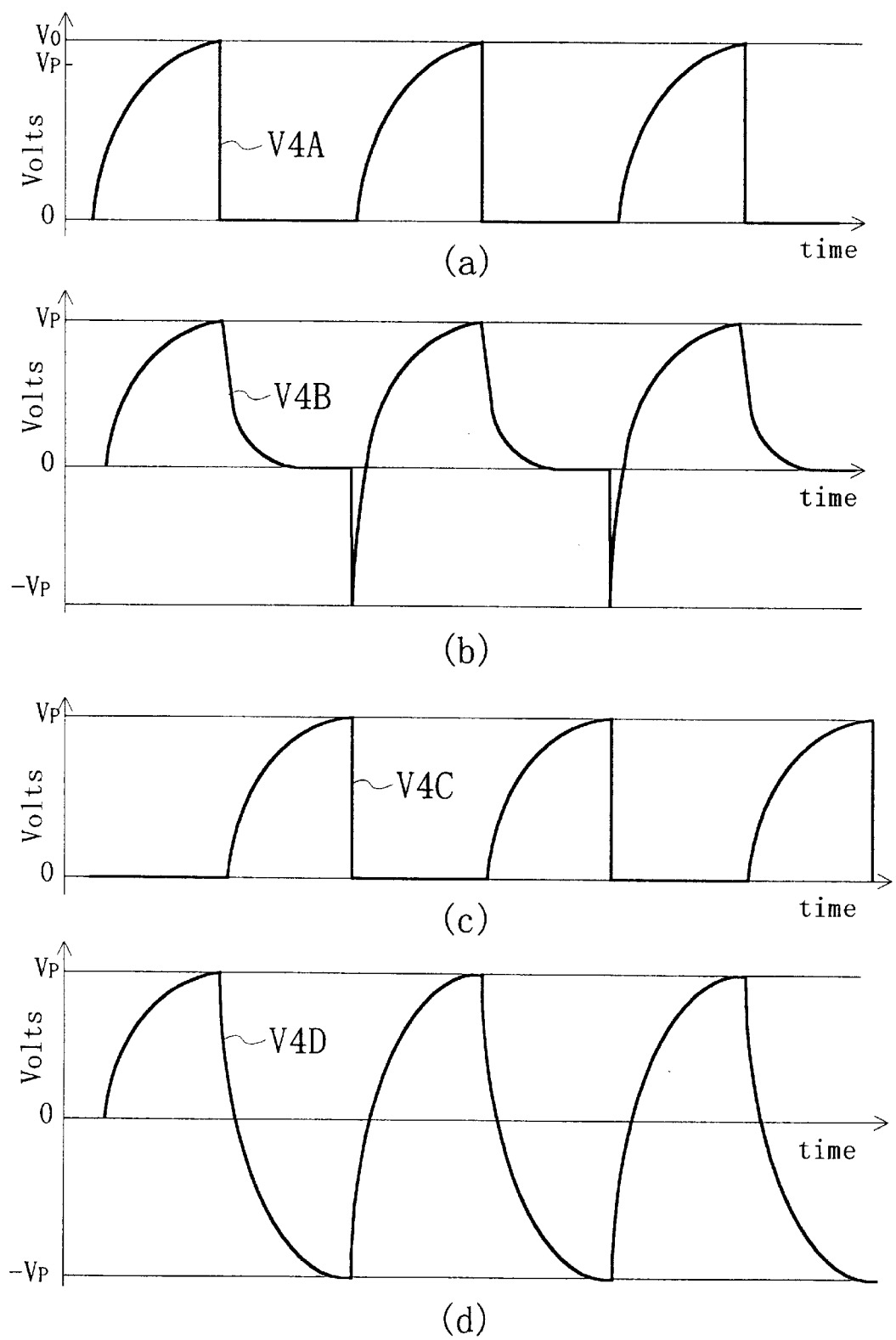

A more specific description will be given with reference to the drawings. During the period during which the voltage V4A shown in FIG. 10(a) is increased, the voltage V4C at the second output terminal Y shown in FIG. 10(c) remains 0 V. Since charging is performed via the resistor 108, a voltage drop caused by the resistance component of the resistor 108 is observed in the waveform of the output during charging from the first output terminal X, as shown in FIG. 10(b). If the voltage V4B is increased to a specified peak voltage VP, the voltage detector 107 detects the peak voltage VP and inverts the polarity of the detect signal V7 to the LOW level. In response to the peak voltage VP on the LOW level, the first polarity inverting transistor 121 and the second discharging transistor 124 are turned OFF, while the second polarity inverting transistor 122 and the first discharging transistor 123 are turned ON, so that the voltage V4C shown in FIG. 10(c) is increased and the voltage V4A shown in FIG. 10(a) becomes 0 V. This releases accumulated charges via the resistor 108 and thereby effects the integration of the voltage V4B at the first output terminal X with the product of the capacitance component of the EL element 101 and the resistance component of the resistor 108, so that the falling-edge portion of the waveform is flattened as shown in FIG. 10(b).

When the voltage V4C at the second output terminal Y shown in FIG. 10(c) is increased to the peak voltage VP, the respective conductivity types of the polarity inverting transistors 121 and 122 and of the discharging transistors 123 and 124 are switched, so that the voltage V4A shown in FIG. 10(a) is increased. On the falling edge of the voltage V4C at the second output terminal Y to 0 V shown in FIG. 10(c), the voltage V4B at the first output terminal X shown in FIG. 10(b) momentarily drops by a potential corresponding to a voltage drop in the voltage V4C and then starts rising.

As shown in FIG. 10(d), the waveform of the applied voltage V4D composed of the difference between the voltage V4B at the first output terminal X and the voltage V4C at the second output terminal Y has a falling-edge portion from the peak voltage VP to 0 V flattened. Moreover, the maximum absolute value of the voltage V4D applied to the EL element 101 is VP, which is the same as in the case where the resistor 108 is not provided, so that the luminance of the EL element 101 is not lowered.

The peak voltage VP has been adjusted to a value equal to or less than the drain withstand voltage of each of the polarity inverting transistors 121 and 122 and of the discharging transistors 123 and 124.

Thus, according to the present embodiment, the voltage detector 107 monitors the voltage applied to the EL element rising till it reaches the peak voltage VP without depending on time and inverts the polarity of the applied voltage upon detecting the peak voltage VP, so that the maximum absolute value of the voltage applied to each of the EL elements 101 is approximately the same even when the EL element 101 having relatively large capacitance and the EL element 101 having relatively small capacitance coexist. Consequently, the display device composed of a plurality of EL elements 101 exhibits no luminance variation. Although the respective capacitances of the EL elements 101 vary along the time axis, they will not affect the display condition since ac current on the order of 400 Hz is used.

Moreover, since the resistor 108 is provided in series between the switching circuit 120 and the first output terminal X, vibrations produced by the EL driving apparatus can be lessened by flattening the steep falling-edge portion of the waveform of the applied voltage V4D resulting from the generation of an ac signal, which suppresses noise from vibrations.

To reduce the vibrating sound, i.e., driving sound of the EL element 101, it is sufficient to adjust the fall time between the peak voltage VP and 0 V in the waveform of the voltage applied to the EL element 101 to be several tens of microseconds by setting the resistance value of the resistor 108 at several kilohms.

Since the peak voltage VP detected by the voltage detector 107 has been adjusted to be equal to or lower than the withstand voltage of each of the transistors 121 to 124 and the withstand voltage of the EL element 101, a voltage over the peak voltage VP is not applied to any of the transistors 121 to 124 composing the driving circuit even when the EL element 101 is replaced or disconnected for some reason or other, so that none of the transistors 121 to 124 is destroyed.

(First Variation of Fifth Embodiment)

A first variation of a fifth embodiment of the present invention will be described with reference to the drawings.

Figure 11:
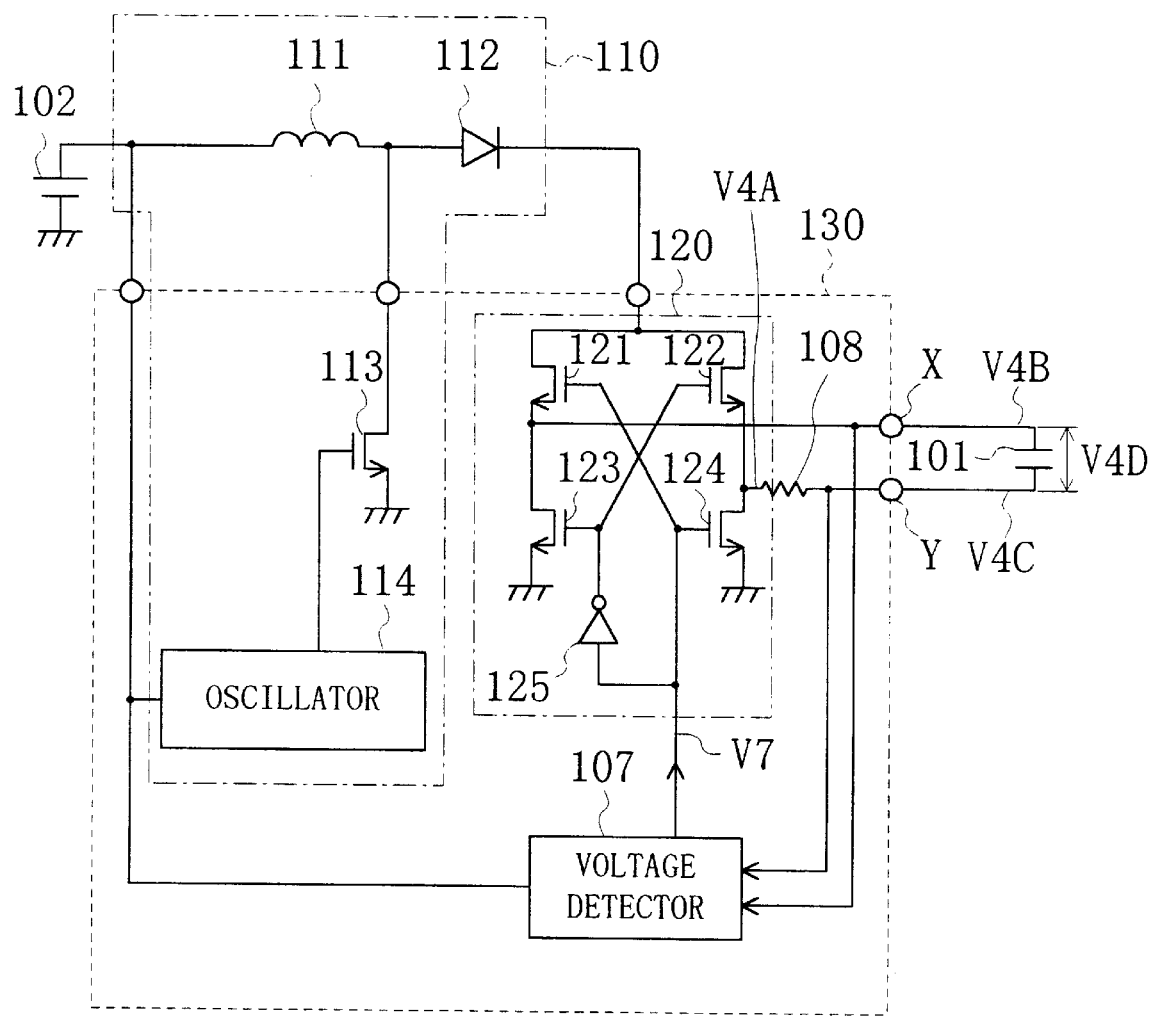
FIG. 11 is a circuit diagram of an EL driving apparatus according to a first variation of the fifth embodiment.

FIG. 11 shows a circuit configuration of an EL driving apparatus according to the first variation of the fifth embodiment. The resistor 108 for flattening the waveform of the output from the EL element during discharging is connected in series between the switching circuit 120 and the second output terminal Y, not between the switching circuit 120 and the first output terminal X. In FIG. 11, the voltage V4A indicates the source voltage of the second polarity inverting transistor 122.

Figure 12:
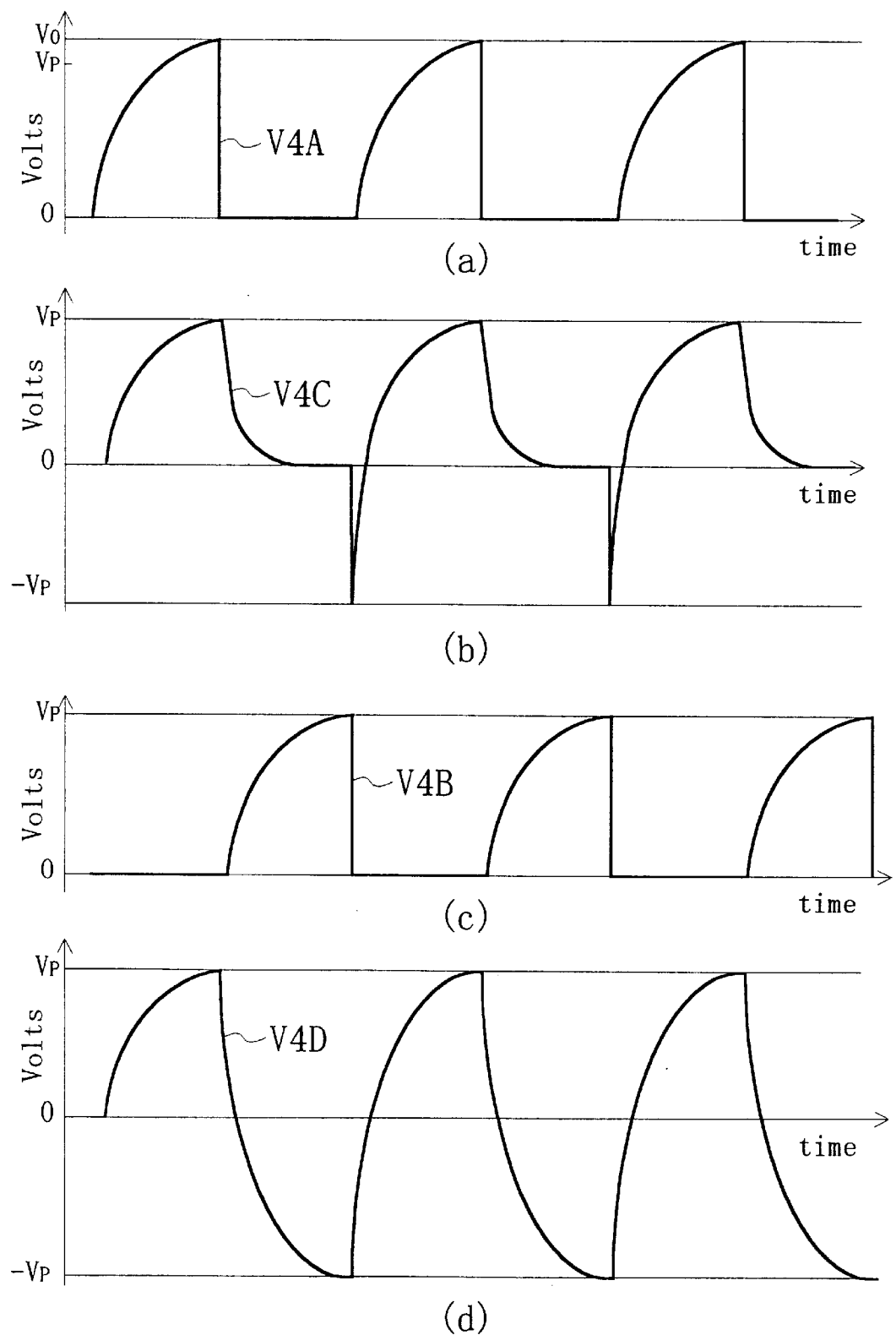

According to the first variation, since accumulated charges are released via the resistor 108 during discharging from the second output terminal Y, the resistance component of the resistor 108 causes a delay, which flattens the falling edge portion of the waveform of the output as indicated by the voltage V4C in FIG. 12(b). Consequently, the waveform of the voltage V4D applied to the EL element 101 composed of the difference between the voltage V4B at the first output terminal X and the voltage V4C at the second output terminal Y has the falling-edge portion from the increased voltage VP to 0 V flattened, as shown in FIG. 12(d), so that similar effects as achieved by the fifth embodiment are achieved.

(Second Variation of Fifth Embodiment)

A second variation of the fifth embodiment of the present invention will be described with reference to the drawings.

Figure 13:
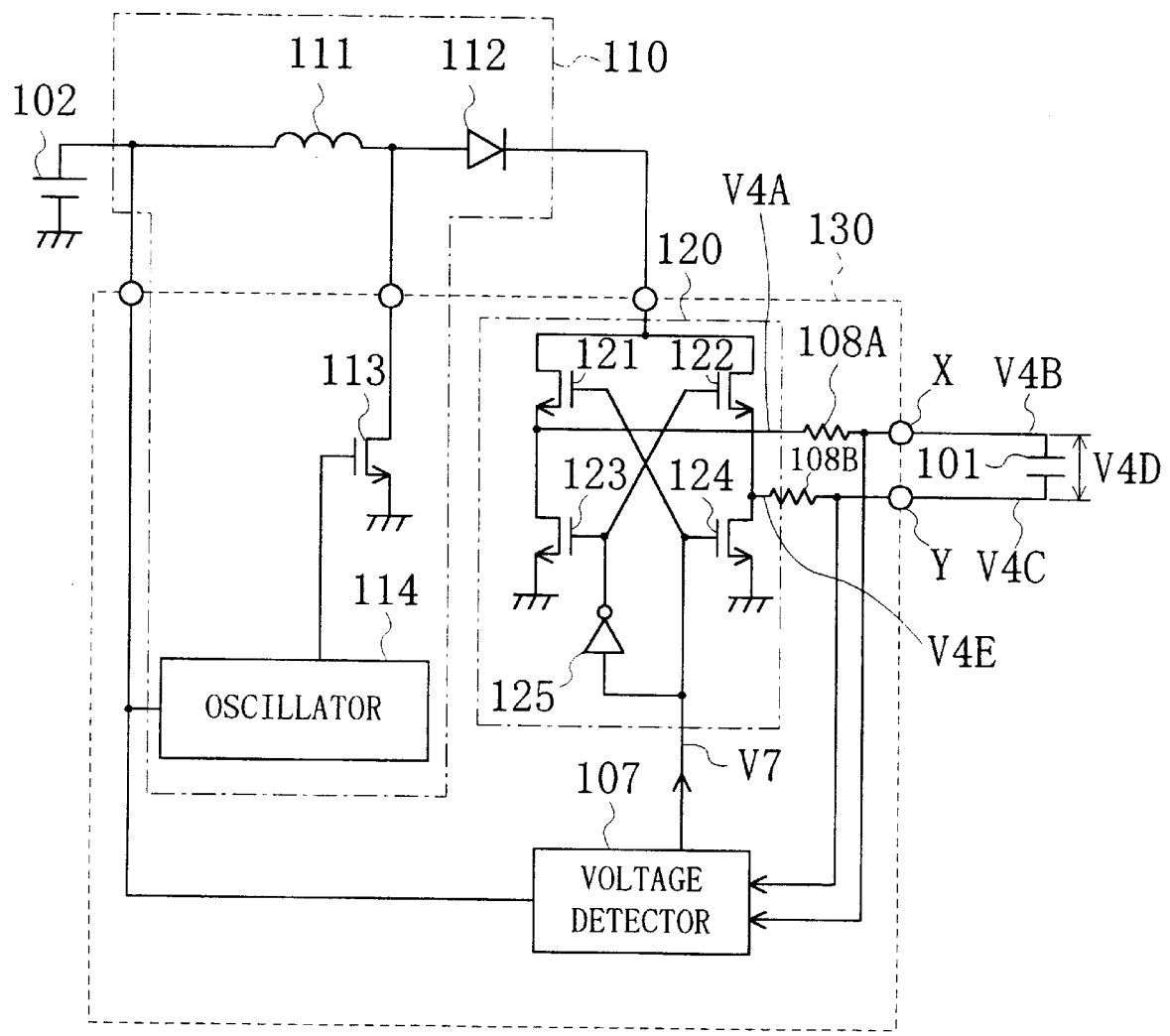
FIG. 13 is a circuit diagram of an EL driving apparatus according to a second variation of the fifth embodiment.

FIG. 13 shows a circuit configuration of an EL driving apparatus according to the second variation. First and second resistors 108A and 108B, each for flattening the waveform of the output from the EL element during discharging, are connected in series between the switching circuit 120 and the first output terminal X and between the switching circuit 120 and the second output terminal Y, respectively. In FIG. 13, the voltage V4A represents the source voltage of the first polarity inverting transistor 121 and the voltage V4E represents the source voltage of the second polarity inverting transistor 122.

Figure 14:
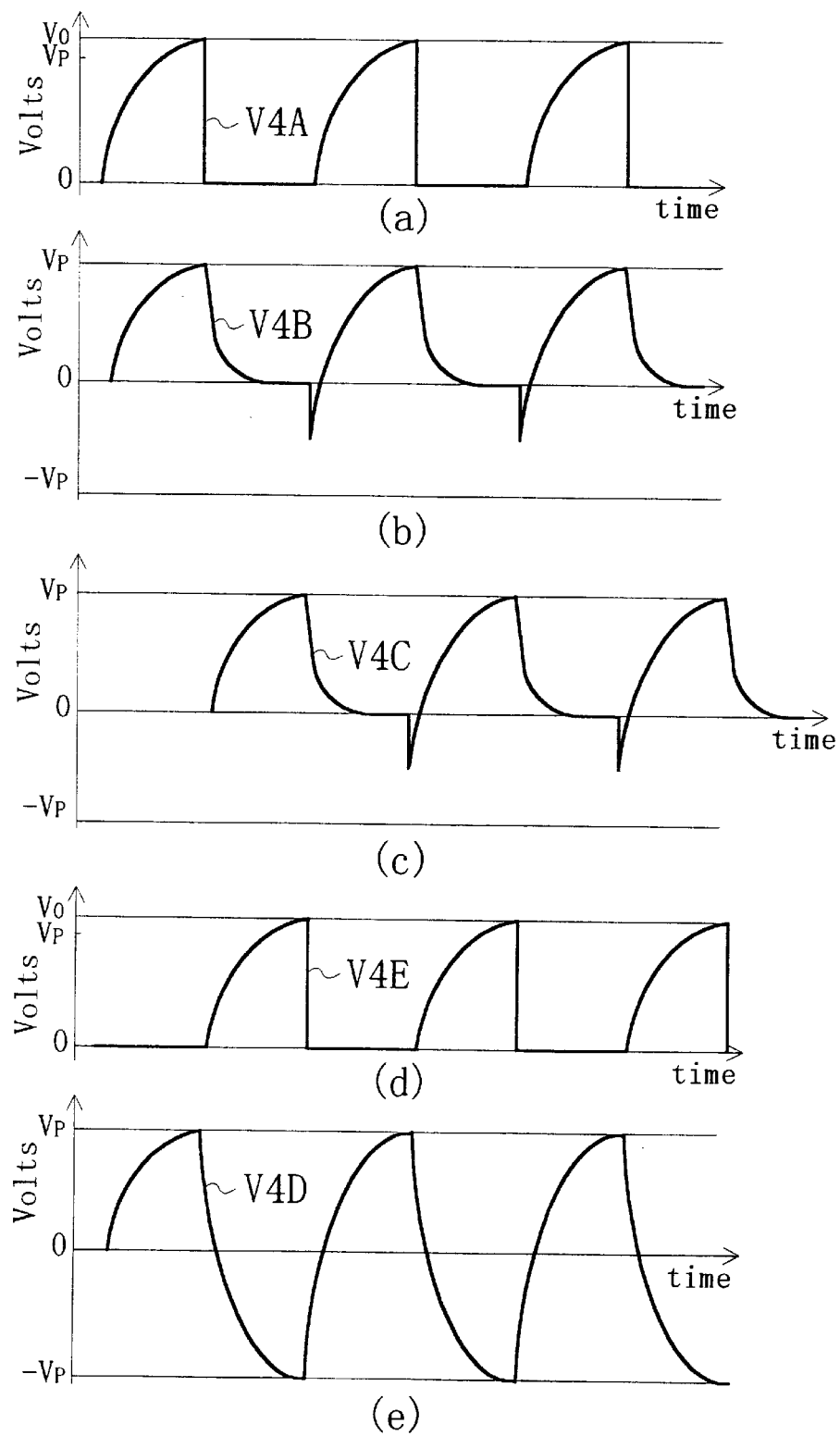

According to the second variation, since accumulated charges are released via the first resistor 108A during discharging from the first output terminal X, the resistance component of the first resistor 108A causes a delay, which flattens the falling-edge portion of the waveform of the output as indicated by the voltage V4B in FIG. 14(b). Likewise, since accumulated charges are released via the second resistor 108B during discharging from the second output terminal Y, the resistance component of the second resistor 108B also causes a delay, which flattens the falling-edge portion of the waveform of the output as indicated by the voltage V4C in FIG. 14(c). As a result, the waveform of the voltage V4D applied to the EL element 101 has the falling-edge portion from the increased voltage VP to 0 V flattened, so that similar effects as achieved by the fifth embodiment are achieved. It is to be noted that the voltage momentarily drops immediately before it rises and then starts rising, as shown in the waveform charts of output signals of FIGS. 14(b) and 14(c).

(Sixth Embodiment)

A sixth embodiment of the present invention will be described with reference to the drawings.

Figure 15:
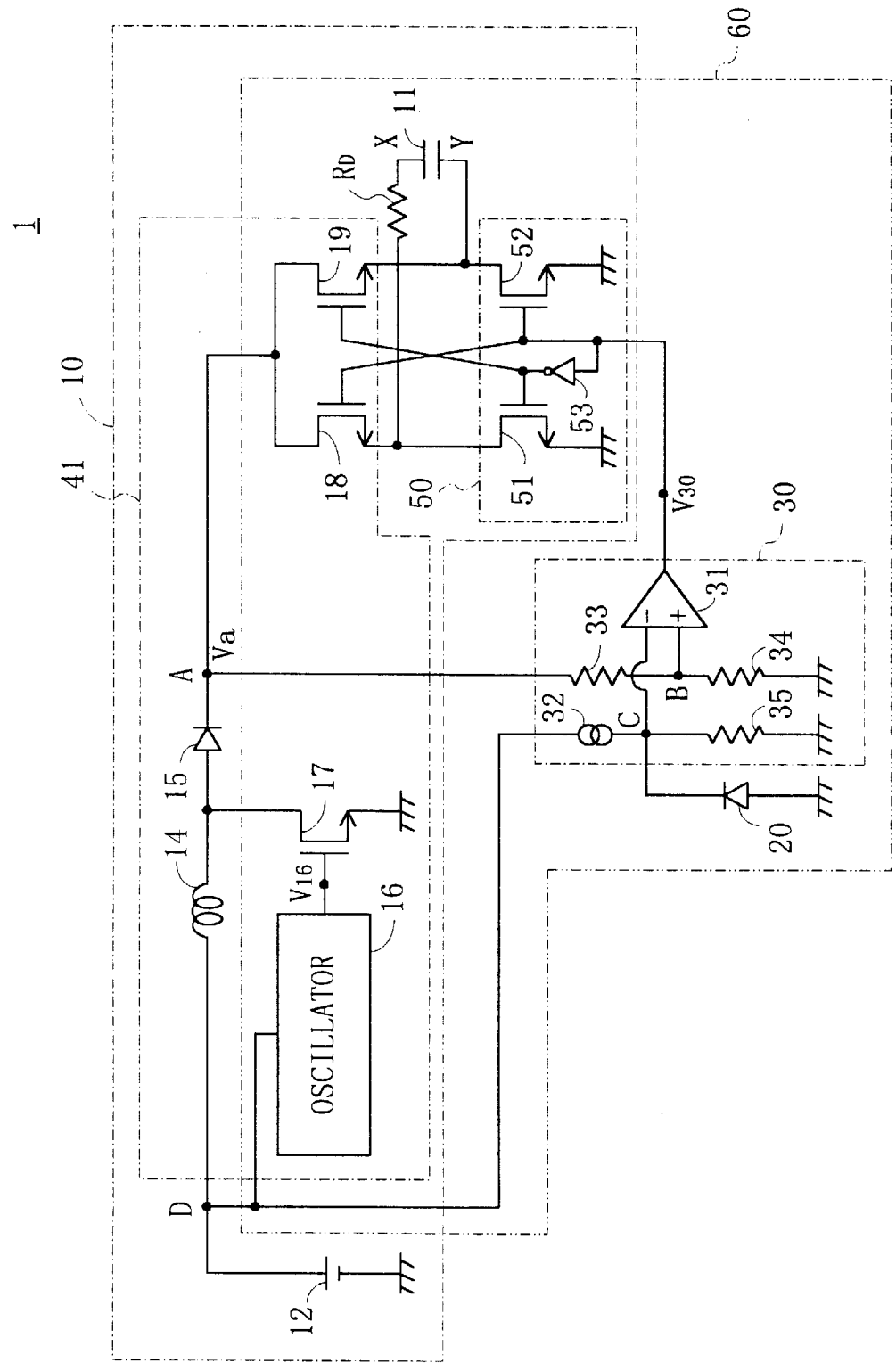
FIG. 15 is a circuit diagram of an EL driving apparatus according to a sixth embodiment of the present invention.
Figure 16:
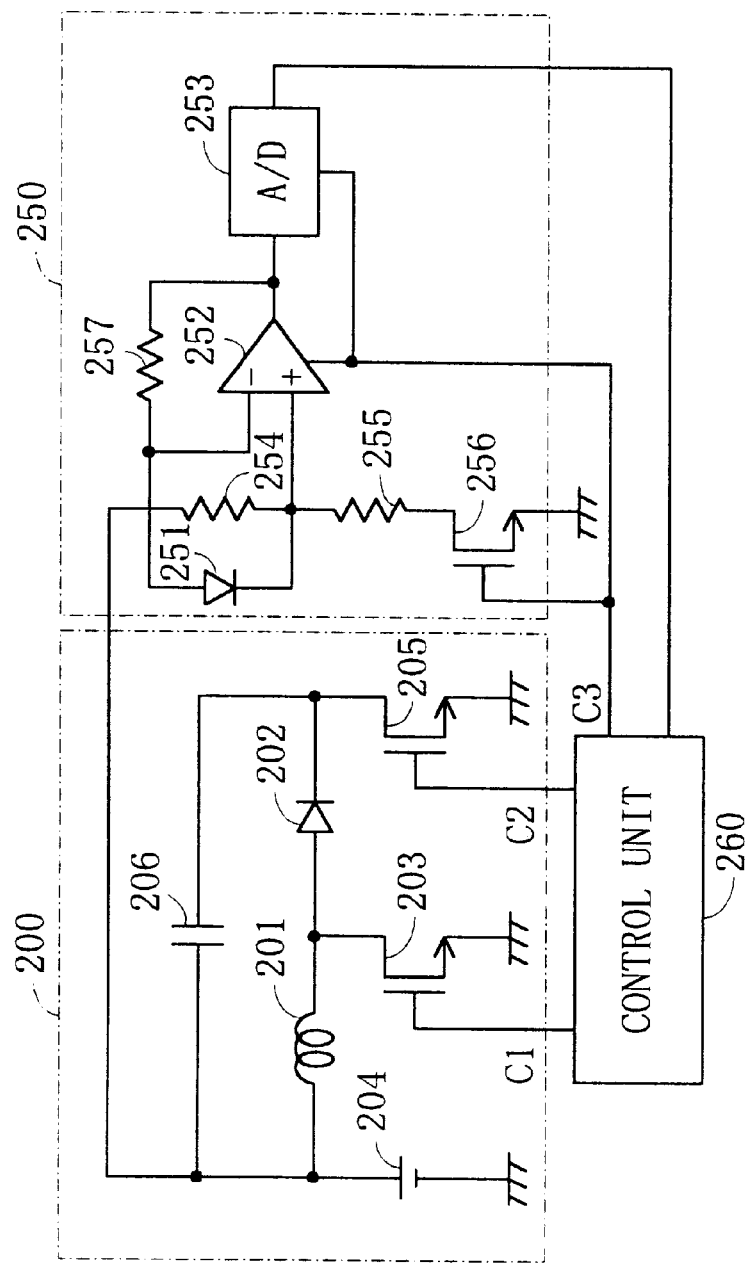
FIG. 16 is a circuit diagram of a conventional EL driving apparatus.

FIG. 15 shows a circuit configuration of an EL driving apparatus according to the sixth embodiment. In FIG. 15, the description of the same components as shown in FIG. 5 will be omitted by providing the same reference numerals.

The sixth embodiment provides the EL driving apparatus which enables luminance control based on ambient brightness and the lowering of noise resulting from ac driving. Between voltage increasing means 41 and the first output terminal X of an EL element 11, a resistor $R_D$ for flattening the waveform of the output by delaying the period during which the EL element is discharged. As described above, since the discharging means 50 partly composing the switching circuit shown in FIG. 5 alternately charges and discharges the two electrodes of the EL element 11, the waveform of the output is steep during discharging. However, if charges accumulated in one of the two electrodes are released via the resistor $R_D$ during the discharging of the EL element 11, the waveform during discharging is flattened, as described in the fifth embodiment, which suppresses vibrations produced by the EL driving apparatus 1.

Although the resistor $R_D$ has been provided only at the side of the first output terminal X in the present embodiment, it may also be provided at the side of the second output terminal Y or at either side.

In the conventional EL driving apparatus which generates a specified period by using the oscillation frequency of the oscillator of the voltage increasing means to switch the switching circuit in the specified period, if a resistor is interposed between the driving circuit for the EL element and the output terminal, the following problem occurs.

Figure 17:
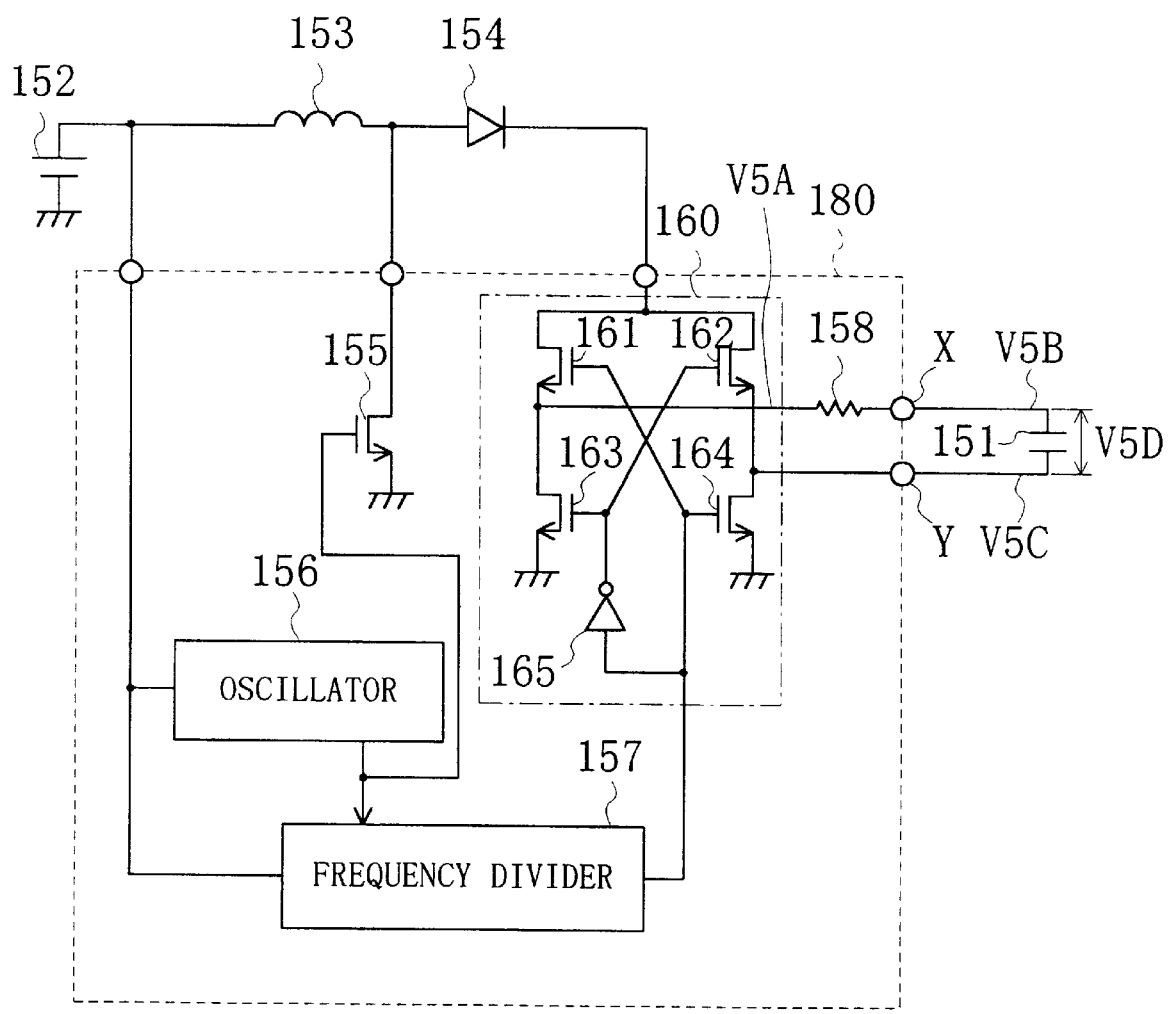
FIG. 17 is a circuit diagram of the conventional EL driving apparatus with an additional resistor for delay.

FIG. 17 shows a circuit configuration of the EL driving apparatus composed of the conventional EL driving circuit provided with an additional resistor for noise reduction. In the drawing are shown: an EL element 151; a dc voltage source 152; a coil 153 for generating a voltage applied to the EL element 151 by increasing a voltage from a dc voltage source 152; a diode 154 for preventing a voltage in the reverse direction from being applied to the coil 153; a region 180 to be integrated into the top surface of a semiconductor substrate; a voltage increasing transistor 155 composed of an N-type MOS transistor having a source connected to the ground; an oscillator 156 having an output terminal connected to the gate of the voltage increasing transistor 155 to determine the switching frequency for the voltage increasing transistor 155; a frequency divider 157 for determining the frequency of an ac signal generated by inverting the polarity of the voltage applied to the EL element 151; and a switching circuit 160 for generating the ac signal by inverting the polarity of the voltage applied to the EL element 151.

The switching circuit 160 is assumed to have the same structure as the switching circuit 120 used previously by the present invention for comparison between the waveforms of the outputs from the EL element 151 during discharging. Accordingly, the switching circuit 160 has first and second polarity inverting transistors 161 and 162 as the polarity inverter for the EL element 151, first and second discharging transistors 163 and 164 as the discharger for the EL element 151, and an inverter 165 for inverting an output signal from the frequency divider 157 and outputting the inverted output signal.

A resistor 158 is connected in series between the first output terminal X and a common connection point for the source of the first polarity inverting transistor 161 and the drain of the first discharging transistor 163.

In FIG. 17, a voltage at the common connection point for the source of the first polarity inverting transistor 161 and the drain of the first discharging transistor 163 is designated at V5A, a voltage at the first output terminal X is designated at V5B, a voltage at a common connection point for the source of the second polarity inverting transistor 162 and the drain of the second discharging transistor 164, i.e., a voltage at the second output terminal Y is designated at V5C, a potential difference between the first and second output terminals X and Y, which is the voltage applied to the EL element 151, i.e., the difference between the voltages V5B and V5C is designated at V5D.

A description will be given to the operation of the conventional EL driving apparatus thus constituted. If it is assumed that the frequency divider 157 outputs a change-over signal on the HIGH level in FIG. 17, the first polarity inverting transistor 161 and the second discharging transistor 164 are initially turned ON in the switching circuit 160, while the second polarity inverting transistor 162 and the first discharging transistor 163 are turned OFF. Consequently, the source voltage V5A of the first polarity inverting transistor 161 is increased, while the voltage V5C at the second output terminal Y becomes 0 V.

Figure 18:
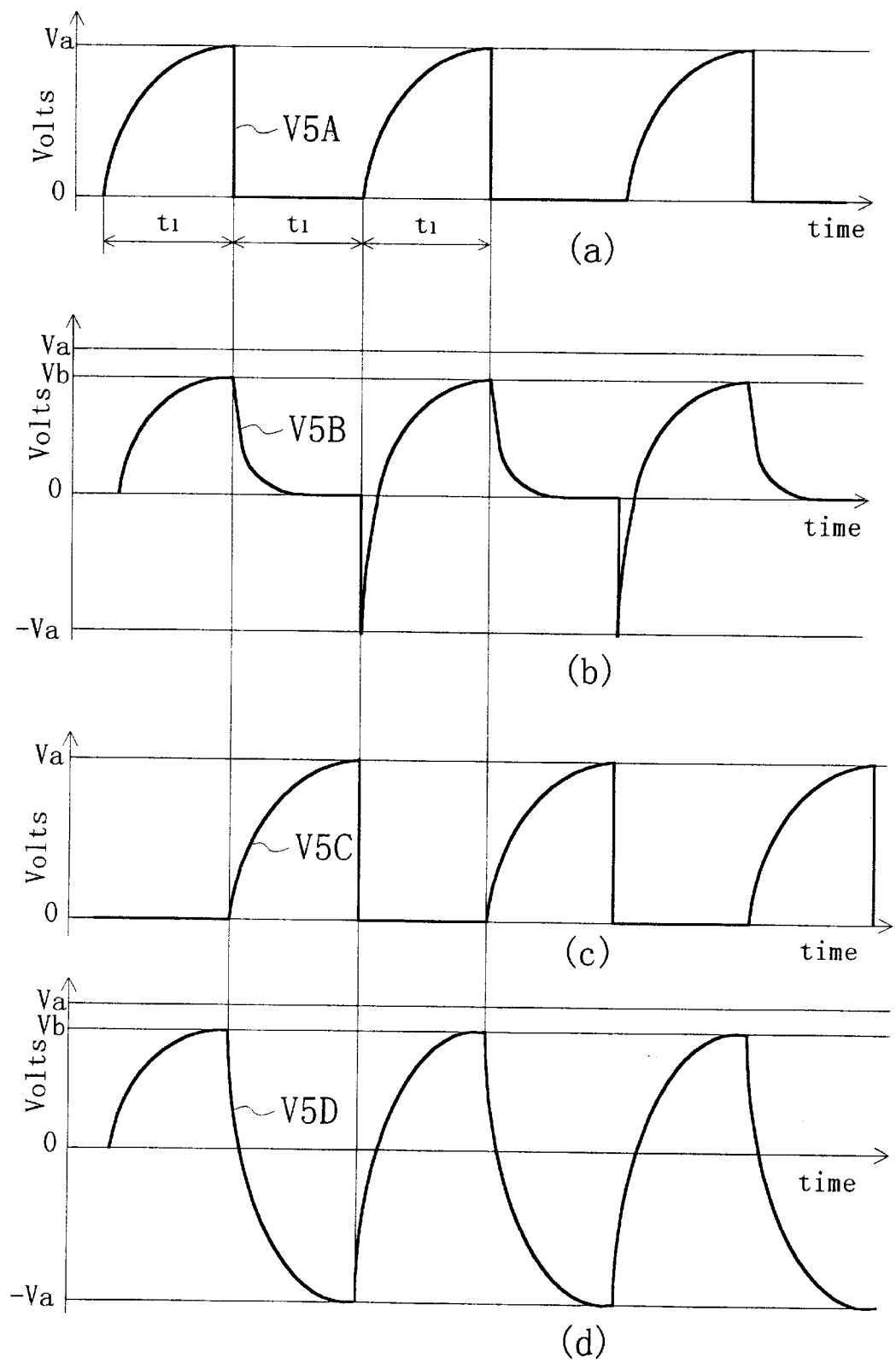

The foregoing process will be described with reference to the drawings. During the period during which the voltage V5A shown in FIG. 18(a) is increased, the voltage V5C at the second output terminal Y shown in FIG. 18(c) remains 0 V. A voltage drop caused by the resistance component of the resistor 158 is observed in the waveform of the output during charging from the first output terminal X, as shown in FIG. 18(b), so that the voltage V5B at the first output terminal X is lower than the voltage V5A by the value of (Va−Vb).

After a specified time t1 determined by the frequency divider 157 has elapsed, the first polarity inverting transistor 161 and the second discharging transistor 164 are subsequently turned OFF, while the second polarity inverting transistor 162 and the first discharging transistor 163 are turned ON, so that the voltage V5C at the second output terminal Y shown in FIG. 18(c) is increased, while the voltage V5A shown in FIG. 18(a) becomes 0 V. Since accumulated charges are released via the resistor 158, the voltage V5B in FIG. 18(b) is integrated with the product of the capacitance component of the EL element 151 and the resistance component of the resistor 158, so that the falling-edge portion of the waveform of the output during discharging from the first output terminal X is flattened.

After another specified time t1 has elapsed subsequently, the ON state and the OFF state of the individual transistors of the switching circuit 160 are switched again so that the voltage V5A is increased, while the voltage V5C becomes 0 V, as shown in FIGS. 18(a) and 18(c). Meanwhile, the voltage V5B at the first output terminal X shown in FIG. 18(b) momentarily drops by a potential corresponding to a voltage drop in the voltage V5C and then starts rising.

Thus, as shown in FIG. 18(d), the waveform of the applied voltage V5D composed of the difference between the voltage V5B at the first output terminal X and the voltage V5C at the second output terminal Y has the falling-edge portion from the increased voltage to 0 V flattened. This allows the steep falling-edge portion of the waveform of the voltage, which has previously caused the vibrating sound of the EL element 151, to be delayed and thereby reduces noise.

However, the provision of the resistor 158 causes a voltage drop corresponding to the value of (Va−Vb) in the voltage V5D applied to the EL element 151 and reduces the luminance of the EL element 151 disadvantageously.

Figure 19:
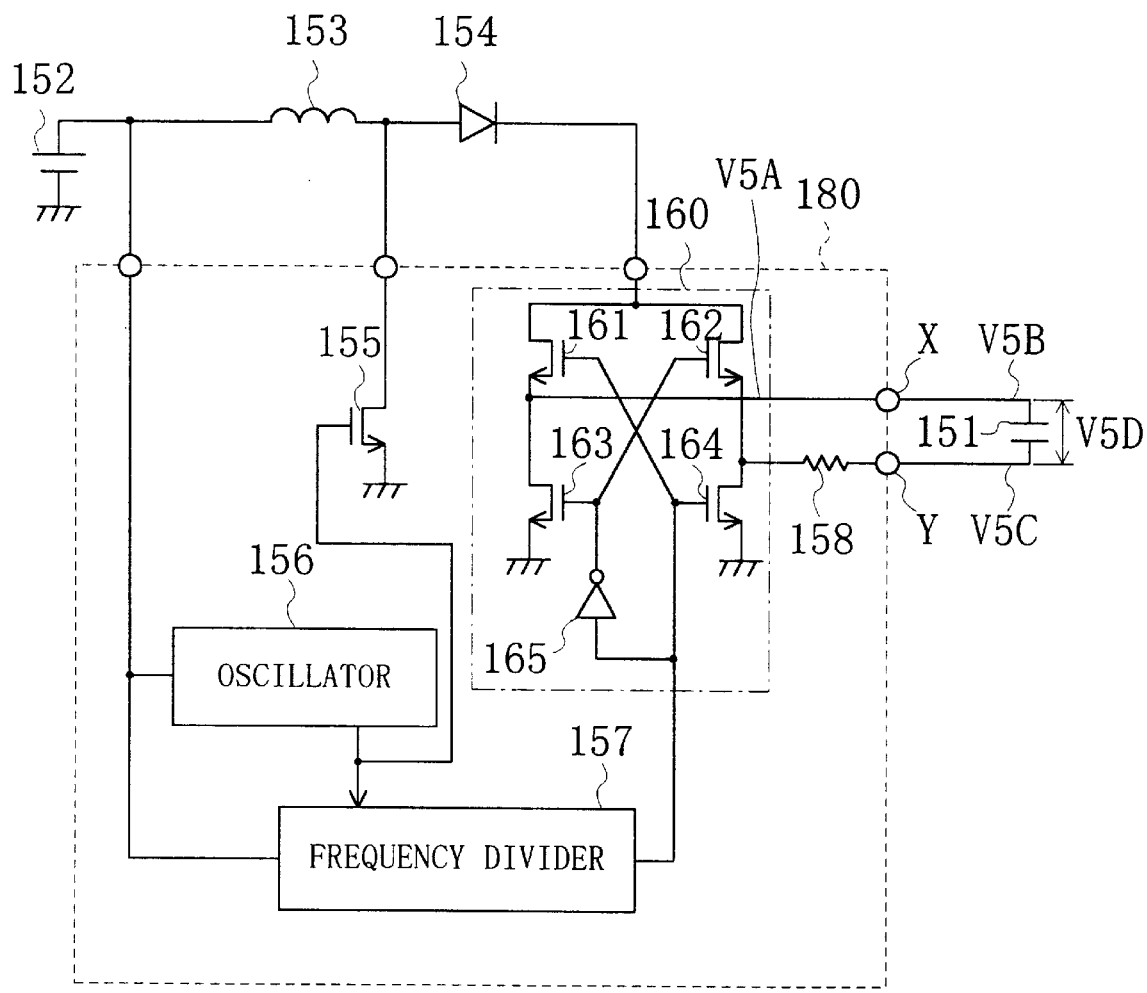
FIG. 19 is a circuit diagram of the conventional EL driving apparatus with the additional resistor for delay.
Figure 20:
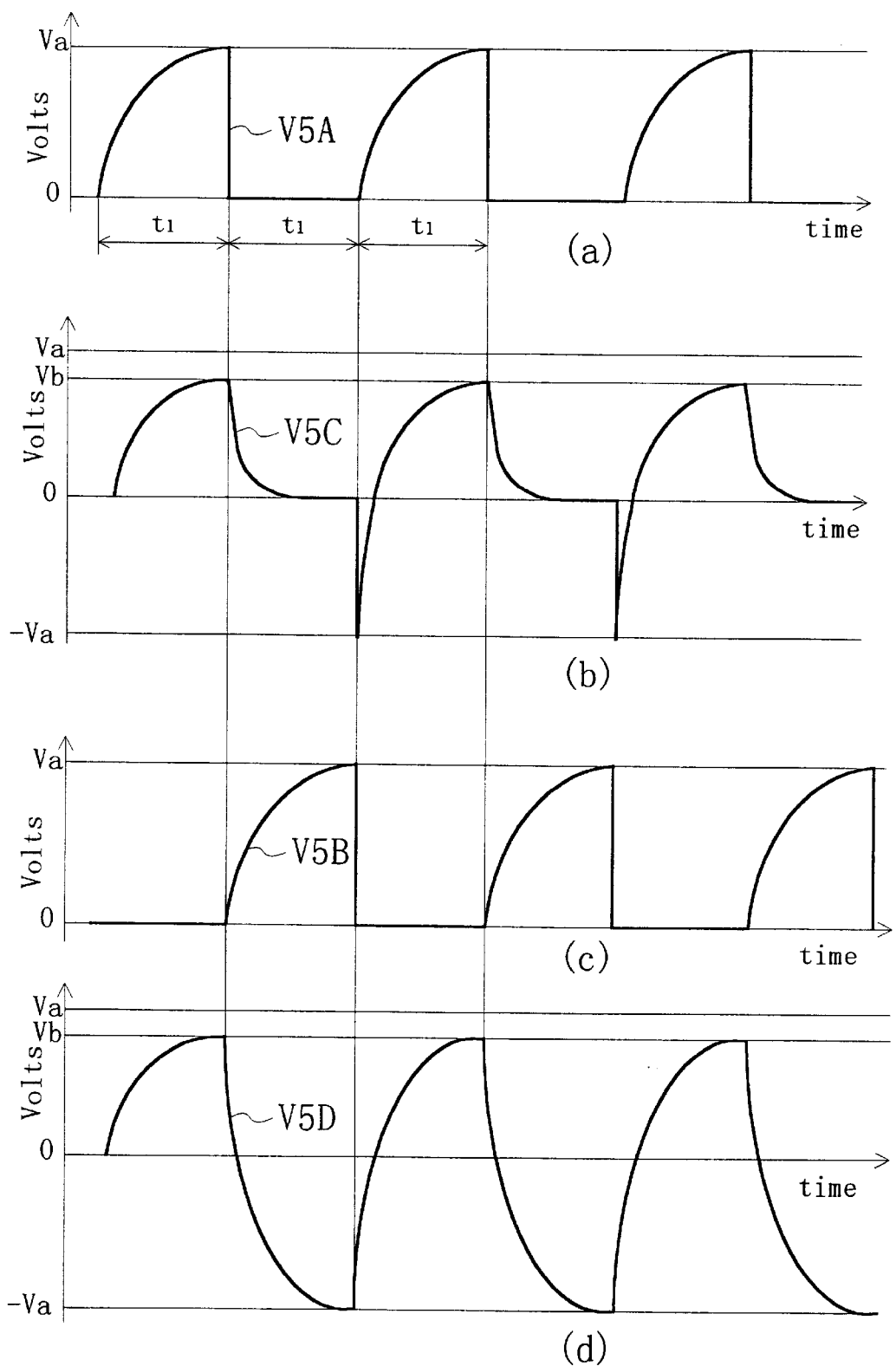

Even when the resistor 158 is connected in series to the second output terminal Y, not to the first output terminal X as in the EL driving apparatus shown in FIG. 19, it will be understood from FIG. 20(d) that a voltage drop corresponding to the value of (Va−Vb) resulting from the resistor 158 occurs in the voltage V5D applied to the EL element 151.

Figure 21:
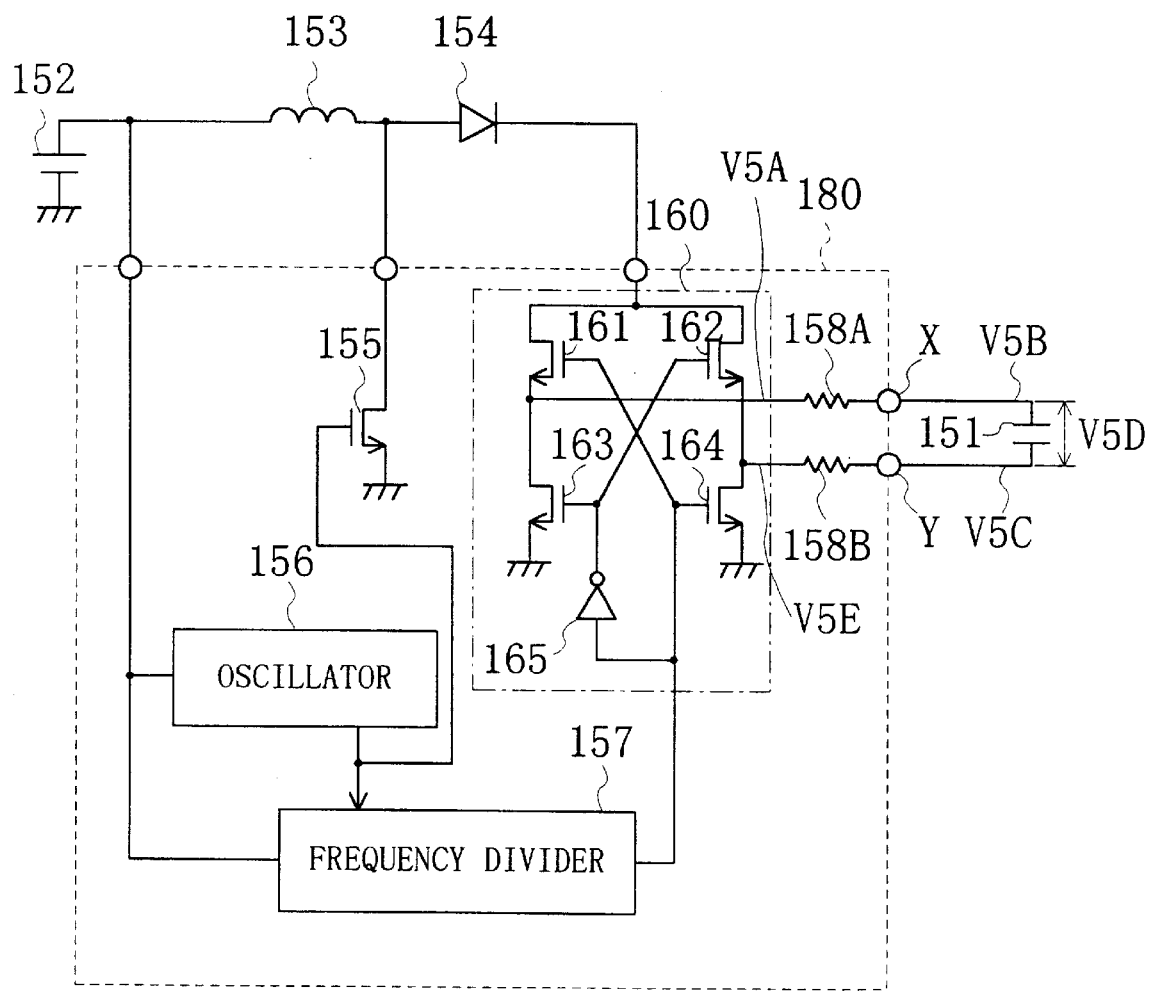
FIG. 21 is a circuit diagram of a conventional EL driving apparatus with the additional resistors for delay.
Figure 22:
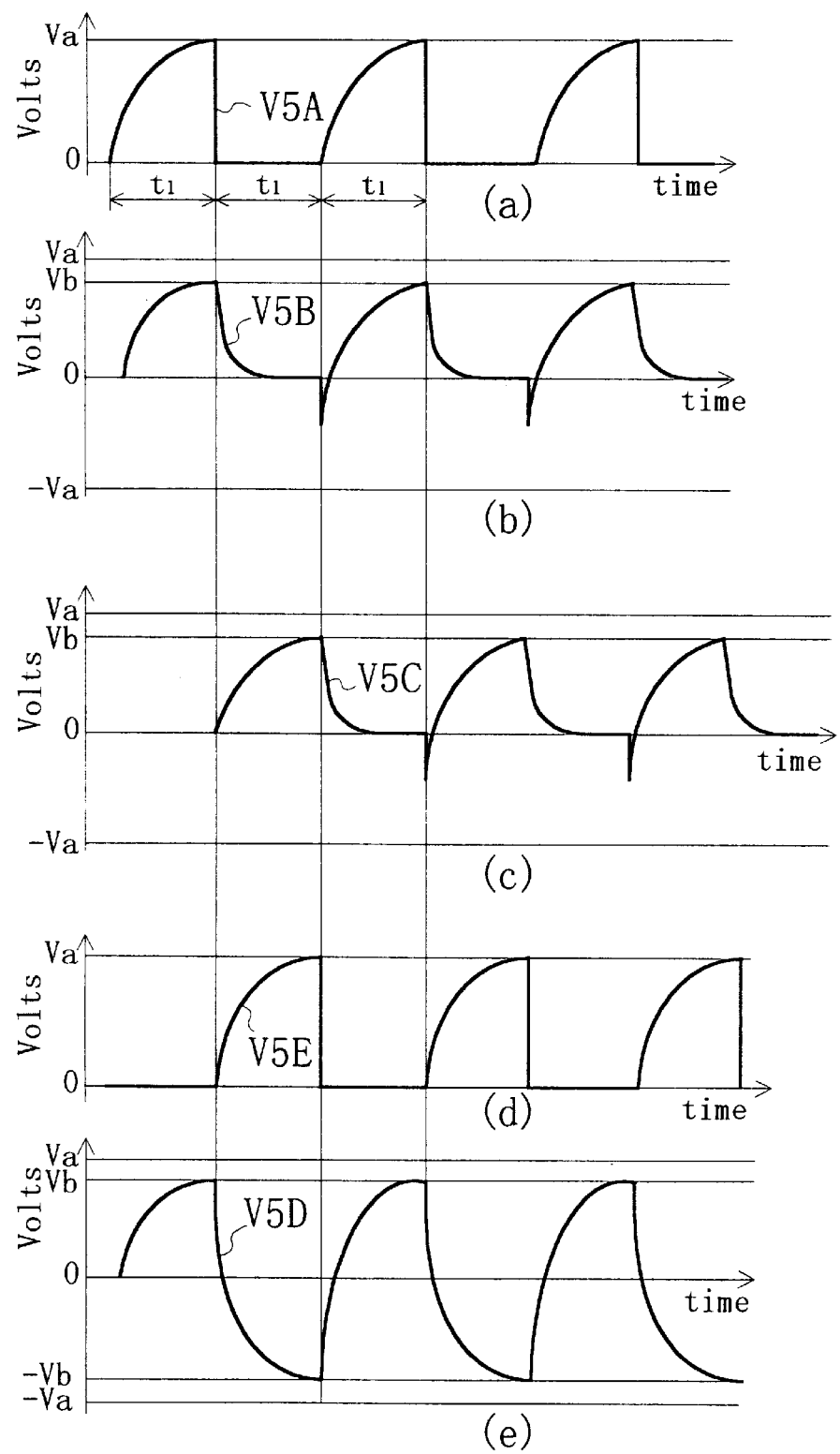

In the case where the first resistor 158A is connected in series to the first output terminal and the second resistor 158B is connected in series to the second output terminal Y as in the EL driving apparatus shown in FIG. 21, it will be understood from FIG. 22(e) that a voltage drop corresponding to the value of 2×(Va−Vb) occurs in the voltage V5D applied to the EL element 151, compared with the case where the two resistors 158A and 158B are not provided.

By contrast, the EL driving apparatus according to the fifth embodiment of the present invention and to the variations thereof are free from such a voltage drop so that noise reduction is achieved without lowering the luminance of the EL element.

We claim:

1. An electroluminescent driving apparatus for causing an electroluminescent element to emit light by repeatedly applying an increased voltage to said electroluminescent element and releasing charges accumulated in said electroluminescent element by said increased voltage applied thereto, said apparatus comprising:

voltage increasing means for generating said increased voltage to be applied to said electroluminescent element;

discharging means for releasing the charges accumulated in said electroluminescent element by said voltage increasing means;

control means for activating said discharging means when said increased voltage reaches a specified peak voltage; and changing means having a photodetector element for sensing ambient brightness, said changing means changing said peak voltage for said control means based on an output from said photodetector element.

2. An electroluminescent driving apparatus according to claim 1, wherein said changing means decreases the value of said peak voltage as ambient brightness increases.

3. An electroluminescent driving apparatus according to claim 1, wherein said changing means increases the value of said peak voltage as ambient brightness decreases.

4. An electroluminescent driving apparatus according to claim 1, wherein said control means has a comparator having one input terminal receiving said peak voltage applied thereto and the other input terminal receiving a reference voltage applied thereto, said comparator comparing said peak voltage with said reference voltage and output a result of comparison to said discharging means, said reference voltage being changed by the output signal from said photodetector element.

5. An electroluminescent driving apparatus according to claim 1, wherein discharging means is composed of a switch element for releasing the charges from said electroluminescent element when said switch element is in the ON state.

6. An electroluminescent driving apparatus according to claim 5, wherein said peak voltage is lower than a withstand voltage of said switch element.

7. An electroluminescent driving apparatus according to claim 1, wherein said voltage increasing means has a first polarity inverting switch element for accumulating charges in one electrode of said electroluminescent element and a second polarity inverting switch element for accumulating charges in the other electrode of said electroluminescent element, said discharging means has a first discharging switch element for grounding said one electrode of said electroluminescent element and a second discharging switch element for grounding said other electrode of said electroluminescent element, and said control means places one pair formed by said first polarity inverting switch element and said second discharging switch element in the ON state, while placing the other pair formed by said second polarity inverting switch element and said first discharging switch element in the OFF state, or places said one pair formed by said first polarity inverting switch element and said second discharging switch element in the OFF state, while placing said other pair formed by said second polarity inverting switch element and said first discharging switch element in the ON state.

8. An electroluminescent driving apparatus according to claim 7, further comprising discharge delay means provided between said discharging means and said electroluminescent element, said discharge delay means delaying a period during which charges are released from said electroluminescent element.

9. An electroluminescent driving apparatus according to claim 7, further comprising a resistor connected in series at least between said first discharging switch element and said one electrode of said electroluminescent element or between said second discharging switch element and said other electrode of said electroluminescent element, said resistor delaying a period during which charges are released from said electroluminescent element.

10. An electroluminescent driving apparatus according to claim 7, wherein said peak voltage is lower than a withstand voltage of any of said first polarity inverting switch element, said second polarity inverting switch element, said first discharging switch element, and said second discharging switch element.

* * * * *